United States Patent
Surati et al.

(10) Patent No.: US 6,456,339 B1
(45) Date of Patent: Sep. 24, 2002

(54) SUPER-RESOLUTION DISPLAY

(75) Inventors: Rajeev J. Surati, Seattle, WA (US); Thomas F. Knight, Jr., Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/181,320

(22) Filed: Oct. 28, 1998

Related U.S. Application Data

(60) Provisional application No. 60/094,962, filed on Jul. 31, 1998.

(51) Int. Cl.$^7$ ................................................. H04N 3/22
(52) U.S. Cl. ........................ 348/745; 348/744; 348/746; 348/806
(58) Field of Search ................................. 348/745, 746, 348/747, 807, 806, 190, 191, 189, 658

(56) References Cited

U.S. PATENT DOCUMENTS

| | | | |
|---|---|---|---|
| 3,943,279 A | 3/1976 | Austefjord | 178/7.3 |
| 4,099,092 A | 7/1978 | Bristow | 315/10 |

(List continued on next page.)

FOREIGN PATENT DOCUMENTS

| | | |
|---|---|---|
| JP | 6 141246 | 5/1994 |
| JP | 07 39504 | 9/1995 |
| JP | 09 326981 | 12/1997 |
| WO | WO 99/31877 | 6/1999 |

OTHER PUBLICATIONS

Lenz, R. K. and Tsai, R. Y., "Techniques for Calibration of the Scale Factor and Image Center for High Accuracy 3D Machine Vision Metrology," in Proc. IEEE, CH2413–3/87;0000/0068501.00 pp. 68–75 (1987).

Holmes, R. E., "Common Projector and Display Modules for Aircraft Simulator Visual Systems," presented at the Image V Conference, Phoenix, Arizona, pp. 81–88, (Jun. 19–22, 1990).

Lyon, P. and Black, S., "A Self–Aligning CRT Projection System with Digital Correction," in SID 84 Digest, pp. 108–111 (1984).

Lyon, P., "Edge–Blending Multiple Projection Displays on a Dome Surface to Form Continuous Wide angle Field–of–View," pp. 203–209.

*Primary Examiner*—John Miller
*Assistant Examiner*—Trang U. Tran
(74) *Attorney, Agent, or Firm*—Hamilton, Brook, Smith & Reynolds, P.C.

(57) ABSTRACT

A super-resolution display derives a map by selectively driving the display while sensing the display output. A stored pixel correction function based on the mapping is applied to pixel data corresponding to the images to be displayed, and the display is driven from the corrected or modified pixel data. This can be used to correct for many types of distortion and to blend images from plural projectors. Pixel data is stored in a frame buffer, and the pixel correction function is applied to the pixel data between the frame buffer and the display, or alternatively, the pixel correction function is applied first, and corrected pixel data is stored in the frame buffer. The display is then driven from the corrected pixel data. In a preferred embodiment, the display comprises a plurality of projectors. The pixel correction function corrects for misalignment of projected overlapping pixel arrays, and blends the overlapping projection regions. In another embodiment, the projected images from plural projectors completely overlap, and the projectors have a small fill factor, resulting in a super-high resolution display. A single projector embodiment corrects for imperfections across the display. The correction functions are derived by composing a screen to sensor mapping with projector to sensor mappings. These mappings are established by optically sensing physical or projected test charts. Preferably, the optical sensor comprises at least one camera, such as a CCD camera. Alternatively, the optical sensor may comprise a pair of orthogonal linear sensor arrays.

91 Claims, 13 Drawing Sheets

U.S. PATENT DOCUMENTS

| | | | | |
|---|---|---|---|---|
| 4,330,813 A | | 5/1982 | Deutsch | 362/244 |
| 4,485,409 A | | 11/1984 | Schumacher | 358/294 |
| 4,634,384 A | | 1/1987 | Neves et al. | 434/44 |
| 4,634,882 A | | 1/1987 | Craine et al. | 250/578 |
| 4,635,105 A | | 1/1987 | Favreau | 358/67 |
| 4,656,506 A | | 4/1987 | Ritchey | 358/87 |
| 4,684,996 A | * | 8/1987 | Baumeister | 348/747 |
| 4,734,779 A | | 3/1988 | Levis et al. | 358/231 |
| 4,757,239 A | | 7/1988 | Starkey, IV | 315/371 |
| 4,760,388 A | | 7/1988 | Tatsumi et al. | 340/717 |
| 4,866,530 A | | 9/1989 | Kalua | 358/237 |
| 4,890,314 A | | 12/1989 | Judd et al. | 379/53 |
| 4,924,318 A | | 5/1990 | Ho | 358/250 |
| 4,974,073 A | | 11/1990 | Inova | 358/87 |
| 4,999,703 A | | 3/1991 | Henderson | 358/60 |
| 5,020,116 A | | 5/1991 | Macaulay | 382/44 |
| 5,065,076 A | | 11/1991 | Koebel | 351/368 |
| 5,091,773 A | | 2/1992 | Fouche et al. | 358/10 |
| 5,111,103 A | | 5/1992 | DuBrucq | 313/2.1 |
| 5,130,794 A | | 7/1992 | Ritchey | 358/87 |
| 5,136,390 A | | 8/1992 | Inova et al. | 358/231 |
| 5,157,503 A | | 10/1992 | Dugdale | 358/238 |
| 5,179,440 A | | 1/1993 | Loban et al. | 358/87 |
| 5,194,959 A | | 3/1993 | Kaneko et al. | 358/225 |
| 5,231,481 A | | 7/1993 | Eouzan et al. | 358/60 |
| 5,242,306 A | | 9/1993 | Fisher | 434/44 |
| 5,258,830 A | | 11/1993 | Schmidt et al. | 358/60 |
| 5,264,694 A | | 11/1993 | Diehl et al. | 250/208.1 |
| 5,329,310 A | | 7/1994 | Liljegren et al. | 348/147 |
| RE34,689 E | | 8/1994 | Wakasa | 348/383 |
| 5,351,097 A | | 9/1994 | Brooke | 348/744 |
| 5,386,228 A | | 1/1995 | Okino | 348/218 |
| 5,396,257 A | | 3/1995 | Someya et al. | 345/1 |
| 5,475,447 A | | 12/1995 | Funado | 348/745 |
| 5,476,314 A | | 12/1995 | Nishiki | 312/7.2 |
| 5,483,299 A | | 1/1996 | Minoura | 348/745 |
| 5,502,481 A | | 3/1996 | Dentinger et al. | 348/51 |
| 5,512,968 A | | 4/1996 | Hagiwara et al. | 353/94 |
| 5,594,676 A | | 1/1997 | Greggain et al. | 364/724.01 |
| 5,619,255 A | | 4/1997 | Booth | 348/36 |
| 5,703,604 A | | 12/1997 | McCutchen | 345/8 |
| 5,793,340 A | | 8/1998 | Morita et al. | 345/7 |
| 5,847,777 A | * | 12/1998 | George | 348/746 |
| 6,100,926 A | * | 8/2000 | Kawashima | 348/745 |
| 6,124,685 A | * | 8/2000 | Toriu et al. | 348/806 |

\* cited by examiner

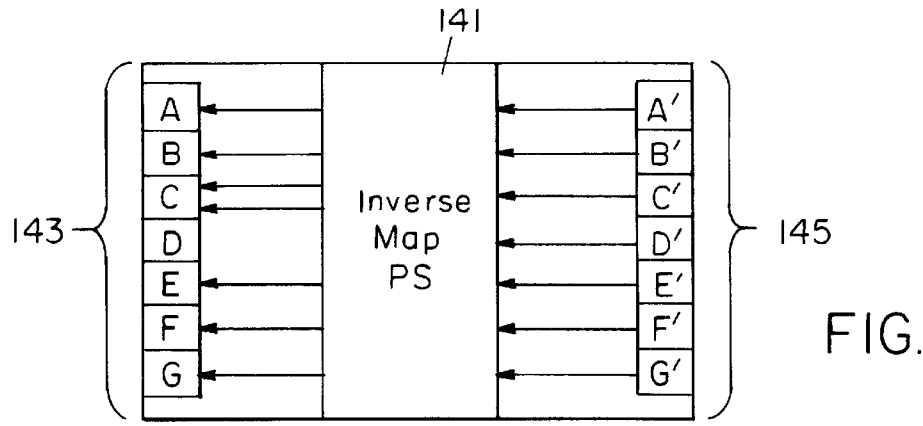
FIG. 11A
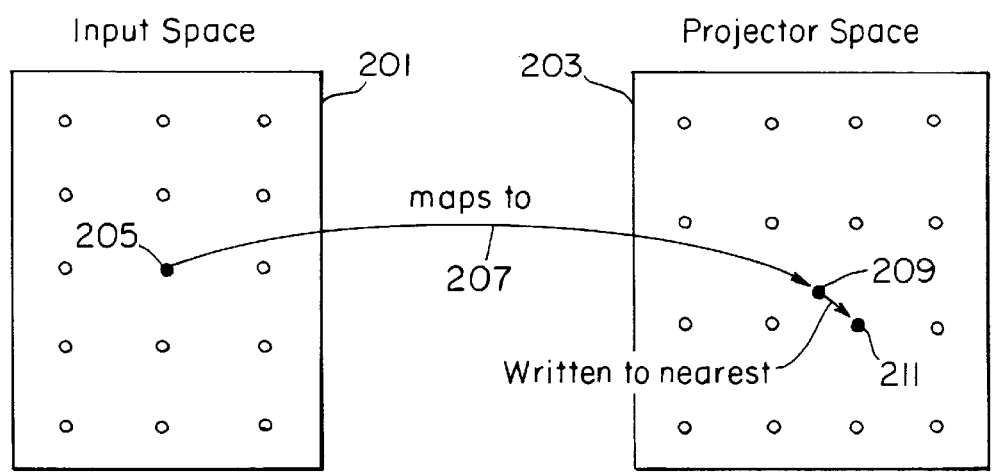
FIG. 11B Forward Mapping, Nearest Neighbor
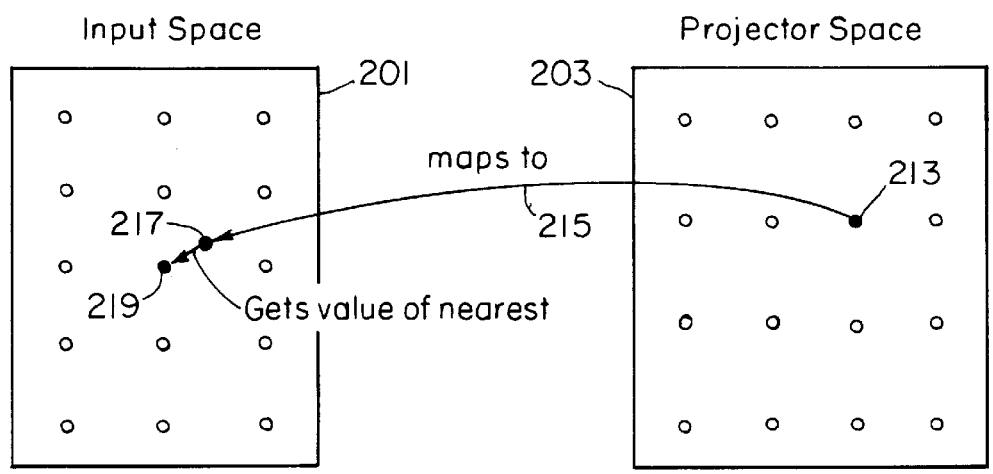
FIG. 11C Reverse Mapping, Nearest Neighbor

SUPER-RESOLUTION DISPLAY

RELATED APPLICATION

This application claims the benefit of U.S. Provisional Application No. 60/094,962, filed Jul. 31, 1998, the entire teachings of which are incorporated herein by reference.

GOVERNMENT SUPPORT

The invention was supported, in whole or in part, by a grant N00014-96-1-1228 from ONR/DARPA. The Government has certain rights in the invention.

BACKGROUND OF THE INVENTION

People love to observe pictures and images displayed all around them. The bigger, the brighter, the higher resolution, and the more inexpensive these displays are the better. The future promises digital cinema and immersive virtual reality systems that provide a realistic visual experience. While the computational power necessary to make these systems a reality is available, high-quality large-scale displays are not.

Typically, computer-generated images are stored as bitmaps in memory. A picture element, or pixel, is represented by three bytes in the bitmap representing color intensities for the red, green and blue values of the pixel. To display the image, the bitmap is stored in a special, high-speed memory called a frame buffer which is accessed by the display hardware. The display hardware may then, from the image stored in the frame buffer, create a composite analog video signal, or separate red, green and blue (RGB) video signals, or whatever type of signal is appropriate for the display.

Current display technology is largely based on the cathode ray tube, the last remaining hot cathode vacuum electronic element in modem computer systems. Resolutions on displays built using this technology are limited by the required precision analog electronics and the achievable bandwidths of high energy video circuitry to 1200×1600 pixels for off the shelf displays, and to 4000×4000 pixels for research prototypes.

Liquid crystal displays are gradually replacing CRTs in portable applications with dramatic improvements in power, but the resolution remains limited to the 1600×1200 pixel range for even high end prototypes.

High performance projection displays exhibit similar resolution limitations, partly due to the large fill factor of the pixel elements required for high optical efficiency. Even the micro-mirror technologies based on micromechanical deflection systems appear (perhaps for market reasons) to be limited to relatively low resolution.

Various aspects of a projection system, such as the optics, defects in the projection screen, the projection angle relative to the screen, etc. can introduce various types of distortion into a displayed image. These include pincushion and barrel distortion which appear as the bowing inward and outward respectively of square objects. Keystoning and trapezoidal distortion results when the projection angle is not perpendicular to the screen angle. Lateral and rotational displacement of the image is directly due to similar displacement of the projector.

Throughout the history of display design, the focus has been on constructing ever larger, higher brightness single display elements. The optical quality, alignment, precision, and perfection in manufacturing these displays has progressed enormously over the past 25 years, but we are still faced with the essential limitation of low resolution of the display array.

A key technological trend of the past 20 years has been the dramatic reduction in the price of computation. The present invention exploits this cost reduction by replacing high precision optical and mechanical assembly with increased computation. As the price of computation continues to drop, this tradeoff increasingly favors computation over precision assembly.

The problems that need to be overcome to make a scalable technology for seamless large-scale displays are elucidated by discussing the prior work in this field. Three well-known technologies are single projector, discrete tiling, and edge-blended projector arrays.

Single projector technology for large-scale displays uses a single optical system and display source to project a large-scale display. While this approach provides a seamless picture, it is not physically scalable. The resolution of such a system is limited to the resolutions of projectors that are available. The resolutions available are determined by the media formats commonly available, for example, NTSC through HDTV from the television industry, and VGA through XGA from the notebook computer industry. To obtain a larger projected image, the distance of the projected image from the projector is increased. The resulting image is larger, but the resolution is constant and brightness decreases inversely with the increase in area projected. Currently there are three types of systems in common use: cathode ray tube based systems, light-valve based (DMD, LCD, ILA) systems, and laser projection systems, discussed below.

Cathode ray tube technology is well understood. Brightness and contrast ratios for these systems are reasonable, and the resolutions available are sufficient for a 60-inch rear-projection screen. The main disadvantages are that building a larger system requires custom built cathode ray tubes to create the appropriate resolution and brightness. In addition, such systems are subject to phosphor burn-in and drift. The best systems available on the market for wide distant viewing require that the displayed images be dynamic to avoid phosphor burn-in, whereby the phosphor surface is physically damaged by other ions where the electrons are supposed to impinge.

Furthermore, color systems using this technology have three separate guns which produce the additive red, green and blue. These guns must be manually converged; however, the convergence typically drifts out of alignment after a month of use. In summary, these disadvantages present problems with scalability of resolution and brightness, and recurrent maintenance problems for maintaining convergence.

Light-valve based systems modulate light to represent each pixel. Such a system uses a light-valve to reflect or transmit light from a light source, based on the intensity of the pixel represented by a particular valve. The light valves are typically liquid crystal displays (LCD), or digital micro-mirror device arrays (DMD), or image light amplifiers (ILA). Each of these systems suffers commercially in the consumer market because costs are higher than pure CRT-based systems. An advantage of light-valves over CRT systems is that they do not suffer from the analog drift and can be made very bright. In terms of scaling these technologies up for resolution and brightness for larger images, there are still fundamental physical concerns. Custom designing a new light-valve for every situation is not possible. Additionally, since only a single light source is typically involved, one would have to search for other solutions when the limits of single bulb technology are hit, though that is not the current constraint.

Laser projection systems utilize "a white" laser (composed of three separate lasers) and a mechanical system much like those inside laser printers, to write raster lines to form an image. There is no theoretical reason why the same resolutions available for laser printing are not possible for display purposes. Thus, resolution scales quite nicely.

The main disadvantage is the expense of making a laser with the necessary power requirements. For example, one system built by Samsung uses a laser with an output power of 4 watts to achieve the brightness necessary for a particular large display. That power output is split up among three separate lasers. The three lasers are powered to take the empirical difference between a watt and lumen for each frequency into account. Such lasers can be expensive and quite dangerous. For example, the system could malfunction and the laser light remain fixed in space, possibly damaging the display surface or anything else in the way.

This technology does not scale well. To quadruple the size of the image, the laser power input must be quadrupled. A system with 100 times the image area needs 100 times the power from a single set of lasers.

It is clear that scalability in resolution and power requirements are major obstacles that need to be overcome to make single projectors good for projecting images larger than the currently available systems provide. Scalability in resolution is a problem for CRT and light-valve based solutions. Scalability in light generation form obstacles for all three of the systems discussed. Discrete tiling is a technology that addresses these scalability problems much better.

Rather than relying on a single projector, discrete tiling juxtaposes single projection systems to create display systems that scale linearly in both resolution and brightness, but are marred by some visible artifacts. A screen four times larger with four times the resolution and the same brightness, requires four times as many projectors. By using existing projection display technology, one gets all the advantages and disadvantages of each technology coupled with two significant visible drawbacks.

The first drawback is a visible mullion, the black area between each projector's projected image, which is typically between 8 and 50 mm. Despite the small width (8 mm) of the mullion, it is noticeable. A second drawback is that each of the projectors must be calibrated to uniformly display each color. Each particular projection technology has its own set of problems that must be addressed to address this uniformity problem. For CRT-based displays, all of the projectors must first be converged. Then, each image must be squared off so that it can be squarely joined with adjacent images across the visible boundary. Finally, color variances across the monitors must be adjusted. Due to analog drift, calibration must be performed monthly. A 20×5 CRT-based system such as is used by the NASDAQ stock market site, typically takes sixteen man-days to fully calibrate.

For light-valve systems, a major problem is that light sources degrade differently across projectors over time. Thus, any corrections to the system must be redone at a later date depending on the amount of usage. If any bulb degrades significantly differently from the others all the bulbs in the system need to be replaced to ensure uniformity.

While the above approach provides large scale systems that scale in resolution and brightness, removing the seam is preferable. Today, small scale seamless systems are available. Commercially available manually calibrated edge-blended linear projector arrays are considered state of the art in seamless large-scale display systems.

In such systems, projectors are fed redundant picture information where the projections overlap in space and positioned so that the redundant pixels overlap exactly in space. The redundantly projected pixels are partially projected by each projector in the overlapping region so the projectors' contributions to a particular pixel's intensity sum to the pixel's overall intensity. Otherwise, the resultant image displayed across the projected area will not appear seamless.

The advantage of this approach is that large-scale displays are available that are high resolution, bright and seamless. The disadvantage is that the approach does not scale beyond a few projectors arranged linearly because of the amount of manual calibration necessary. Several issues arise in manually calibrating these systems and are discussed below.

The first issue is with registration accuracy in the overlap regions of multiple projectors, particularly, getting the projected regions to overlap with highly accurate pixel registration. This requires manual geometric adjustments that can be done positionally, optically and electronically to completely overlap the adjacent projectors, removing pincushion, trapezoid, keystone and other optical distortions.

Even after the edge-match and geometric correction, the overlap region is not usually rectangular. This must be taken into account when manually adjusting both the redundant information fed to each projector and the timing for each line of information.

Another problem is color matching between adjacent projectors. If the projectors' colors do not match and a patch of uniform color is supposed to be displayed across a seam, the visible mismatch will make the seams apparent. Thus, adjacent projectors must be manually adjusted to match across all colors.

Yet another problem is the intensity variation across boundaries. Smoothing function are employed on the data input to each projector to gradually transition the burden of displaying a pixel in the overlap regions between projectors. Care must be taken so that these smoothing function properly deal with the projector's "gamma" correction for each color. Otherwise, the seams appear either brighter than the image or less bright.

When two projectors overlap, edge-blending functions must be created and applied. Each edge-blending function gradually transitions from 100% down to zero. Each projector's edge-blending function is multiplied with pixel values across each input raster line. The edge-blended functions sum to one. This requires that raster lines of the projectors be properly lined up in space. If everything is aligned correctly, the overlap region will look as though it were generated by one projector. These smoothing functions must be manually calibrated for each horizontal input line for each projector.

Still another problem is the brightness uniformity across the entire viewing area. Without brightness uniformity across the system, the edges of each projector's projected image become accented and conspicuous, possibly revealing the seams. Manual calibration that takes this into account normally occurs in smoothing functions. Alternatively, the problem has been optically reduced by increasing the f-number of the lens. In single projector systems there is a brightness gradient from the center of the image to the edge typically caused by lens roll-off. The brightness ratio from center to edge can be as high as 1.66 with some projectors. In rear projection, this aspect coupled with limited projection screen diffusion causes a hotspot effect, the apparent location of which depends on the position of the viewer and the angle of view. In any case, the end result is that the field of view for which the system appears seamless may be limited.

Another problem is the exit pupil size. The exit pupil is the envelope from which quality edge-blending can be viewed. The size of this region is determined by how the projected light rays are absorbed, reflected and diffused by the screen surface. If the image is viewed outside this envelope, a distinct brightness mismatch becomes apparent across projection boundaries. This is a result of the screen surface reflecting or transmitting perceivably unequal amounts of light from juxtaposed projectors toward the viewer.

Screen gain quantifies the dispersion of transmitted or reflected light for either a front projection or rear projection screen. A screen with a gain of 1.0 (unity gain), known as a lambertian screen, is one which disperses light uniformly without regard to its incident angle. The higher the screen gain, the more the dispersion of light is affected by the angle of incidence of the source light. On such screens, one can often observe "hot spots" of high brightness in multiple projector setups that move as the viewpoint changes.

Finally, the degree of manual calibration needed to set up one of these systems becomes ominous when one considers the corrections required for each projector, which is why this approach is not scalable. Creating a two-dimensional array clearly involves even more manual calibration, so much so that such commercial systems are not readily available.

SUMMARY OF THE INVENTION

P. Lyon, "Edge-Blending Multiple Projection Displays On a Dome Surface To Form Continuous Wide Angle Fields-of-View", Evans & Sutherland Computer Corp., pp. 203–207, Proceedings, Nov. 19–21, 1985, 7th Interservice Industry Training Equipment Conference, suggests changing the shape of the projectors' rasters. This, of course, requires additional electronics and precludes the use of existing displays without modification.

However, major technological advances have been made recently in fields ranging from optics to civil engineering, by coupling computation with feedback. As the price of computation continues to decrease, we can enjoy the fruit yielded by technologies that utilize this approach on new problems that require more computational power than available today. The computation-coupled-with-feedback approach can be applied to large-scale displays based on overlapping projection, using commonly available projection hardware, to create a scalable technology which provides the necessary precision and automatic calibration that traditional optical, mechanical and electrical approaches have not been able to provide.

The present invention uses a low-cost technology based on computation coupled-with-feedback to make large-scale displays that provide a realistic visual experience. Automating the calibration phase enables a seamless large-scale display technology which is linearly scalable in resolution and brightness.

Low cost computation coupled with feedback enables the correction of imperfections in the alignment, optical system and fabrication of such very high-resolution display devices as a seamless video wall. More particularly, digital photogrammetry and digital image warping are combined to couple computation with video feedback and projection to provide an entirely new technology that is scalable, bright, high resolution, portable and self-calibrating, and which can create a single seamless image across aggregated overlapping projections. Furthermore this approach enables the creation of display systems which cannot be created by conventional mechanical and optical precision engineering means.

The present invention combines high performance computing with feedback to enable the correction of imperfections in the alignment, optical system and fabrication of very high-resolution display devices. The key idea relies on the measurement of relative alignment, rotation, optical distortion, and intensity gradients of an aggregated set of image display devices using a precision low cost reference. Use of a reference makes it possible to construct a locally correct map relating the coordinate systems of the aggregate display to the coordinate systems of the individual projectors.

The techniques form a new technology for scalable, bright, seamless, high-resolution large-scale self-calibrating displays such as seamless video walls. The technology aggregates low-cost component displays and allows one to linearly scale up resolution or size while maintaining a single level of brightness. None of the three well-known technologies for creating large-scale displays provide results that are as visually satisfactory, portable or scalable. The manual calibration and precision required by those technologies is too great to be scalable. The automatic calibration approach of the present invention is far superior and enables scalability. Low cost computation coupled with feedback is leveraged to provide the necessary precision, and thus correct the distortions digitally.

In accordance with the present invention, a method of displaying images comprises deriving a display map by selectively driving the display while sensing the display output. The image may be generated by, for example, a VCR, laser disc, computer or a combination of these devices. A stored pixel correction function based on the display map is applied to pixel data corresponding to the images to be displayed, and the display is driven from the corrected or modified pixel data. Preferably, the stored pixel correction function comprises an anti-aliasing filter. One or more processors may be used to derive and apply the pixel correction function.

Application of the pixel correction function can be used to correct for many types of distortion, including, but not limited to: imperfections across the display, misalignment of plural projections in a common region; intensity variations across the display; keystone distortion; trapezoidal distortion; pin cushion distortion; barrel distortion; chromatic aberration; color mismatch; and lateral and rotational displacement. In particular, the pixel correction function performs smooth warping of an image.

In a preferred embodiment, the pixel data is stored in a frame buffer, and the pixel correction function is applied to the pixel data between the frame buffer and the display.

In another preferred embodiment, the pixel correction function is applied first, and corrected pixel data is stored in the frame buffer. The display is then driven from the corrected pixel data in the frame buffer.

In yet another preferred embodiment, the display comprises a plurality of projectors. The projectors may be driven from a single frame buffer, or alternatively, each projector may be driven from a separate frame buffer with which it is associated. Furthermore, a separate frame buffer may be provided for each color, e.g., red, green and blue, for each projection region. The pixel correction function corrects for misalignment of projected overlapping pixel arrays, and blends the overlapping projection regions.

In yet another preferred embodiment, the projected images from plural projectors completely overlap, and the projectors have a small fill factor, resulting in a super-high resolution display.

The display output is sensed by an optical sensor, which may sense visible light, or non-visible light such as infrared or ultraviolet light. Preferably, the optical sensor comprises at least one camera, such as a CCD camera. Alternatively, the optical sensor may comprise a pair of orthogonal linear sensor arrays. The optical sensor is calibrated by positioning a calibration test chart at a projection surface. A mapping of projection surface positions or landmarks, to pixels in sensor space is then created by viewing the test chart with the optical sensor. The test chart is positioned, for example, by placing a physical test chart on the projection surface, or alternatively, by projecting the test chart onto the projection surface.

In various embodiments, the projection surface may be flat, spherical, otherwise curved, or even irregular.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 11A is a block diagram illustrating one-dimensional inverse mapping.

FIG. 11B is a diagram illustrating the nearest neighbor approach in forward mapping.

FIG. 11C is a diagram illustrating of the nearest neighbor approach in reverse mapping.

DETAILED DESCRIPTION OF THE INVENTION

To create a super-resolution display based on inexpensive technology, a preferred embodiment of the present invention employs multiple, overlapping projection displays. By tiling the screen with many such projection displays, each point on the entire screen surface is covered by one or more displays. No attempt is made to align the projectors, either mechanically or electrically, either in position, rotation, relative brightness, or relative hue. Instead, the present invention relies on the application of large amounts of computation to perform the perfect "alignment" of these display elements.

Figure 1:
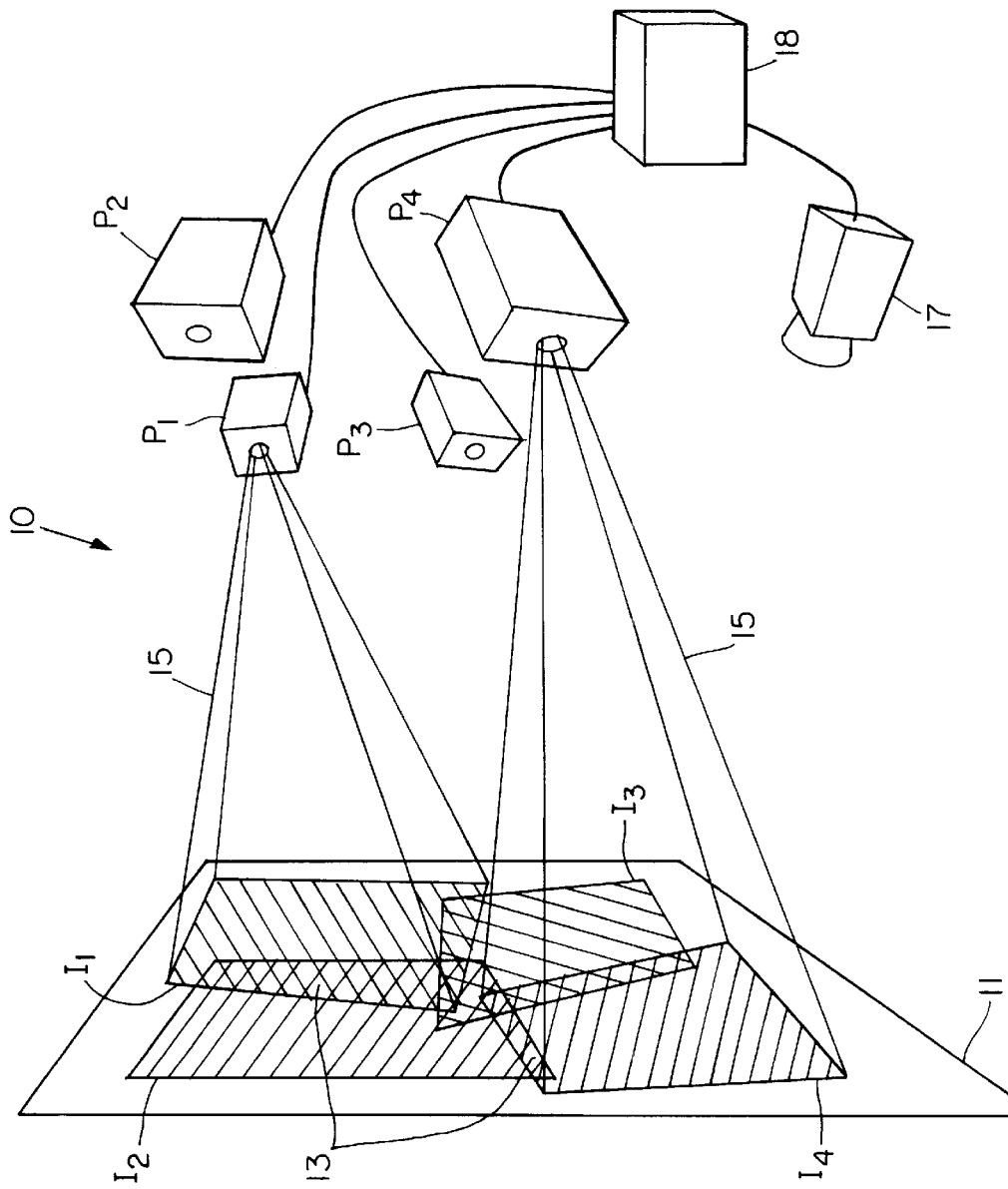
FIG. 1 is a perspective drawing showing an illustrative embodiment of the present invention without the mappings applied.

FIG. 1 illustrates, for demonstration purposes, a 2×2 projector array embodiment 10 of the present invention. Four projectors $P_1$–$P_4$ project their respective images $I_1$–$I_4$ onto a screen 11. Projections for two of the projectors, $P_1$ and $P_4$, are indicated by lines 15. No corrections have been made to the images $I_1$–$I_4$ yet. Note that they are not aligned, and that they overlap, with some of the overlap regions identified by reference number 13. The source of the images, though not shown, may be any of the typical video or image sources, for example, a VCR, a laser disc player, or a computer.

In a preferred embodiment, a camera 17 monitors the screen 11 during a calibration phase, or during frames stolen from a moving display. A picture of the screen 11 taken by the camera 17 is fed back to a computer 18 which also controls the projectors $P_1$–$P_4$. The computer 18 first calibrates the camera 17 with reference to the screen 11, and then establishes a screen to projector mapping, which is used to distort images before they are sent to the projectors. These distortions compensate for the natural distortions of the system, resulting in a seamless, undistorted image composed from the four projectors.

A euclidean, polar, spherical, or other coordinate system if appropriate for the screen, is erected in screen coordinate space S. Each projector has its own, local coordinate space $P_i$. A map is established between the screen and each projector coordinate space via a measurement feedback system.

In a formal way, this mapping is similar to the charts and atlases defined in differential geometry on manifolds. As in the atlas describing a manifold, a single point in the screen coordinate system may be described by multiple charts, each corresponding to a different projector. In addition to positional information, a description may also contain color and intensity information. An attractive feature of this technique is that it also handles the otherwise awkward issue of addressing points in a cylindrical, spherical, or otherwise distorted screen coordinate system.

The active feedback system has the role of providing the invertible mapping between the screen coordinate system and each projector coordinate system. The practical techniques required for establishing this mapping are addressed below.

The approach of computationally defining the mapping between screen and projection coordinate systems corrects a number of defects in existing approaches to tiling large arrays of projectors, in particular, relative displacement, relative rotation, scale factor differences, keystoning, and simple pincushion or barrel distortion. These geometric defects are corrected with a simple mapping of the desired screen coordinate to the point needed in one or more of the projector coordinate systems. Writing to the mapped projector pixel illuminates the desired screen point. These techniques may also be useful in improving the performance of single displays exhibiting difficult-to-correct distortions or intensity and color variations.

Even lateral chromatic aberration can be corrected using these techniques. By establishing independent mappings for each of the three (or six, see below) colors, each color may be written to the appropriate projector coordinate.

Figure 2B:
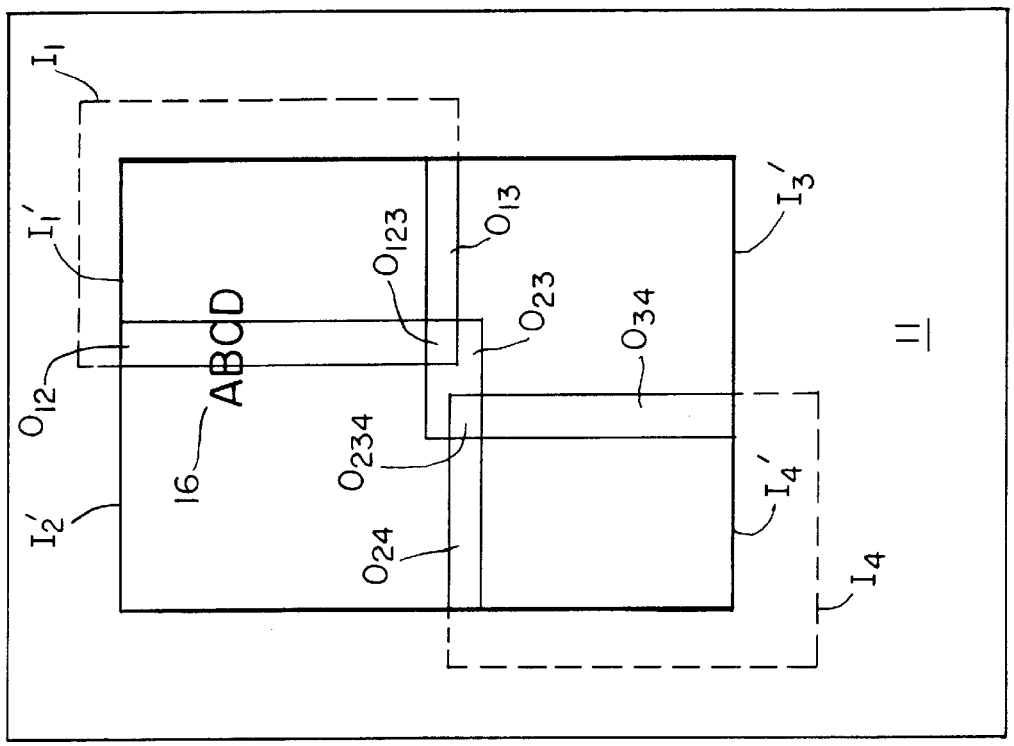
FIG. 2B is another front view of the screen of FIG. 1, after mappings have been applied.
Figure 2A:
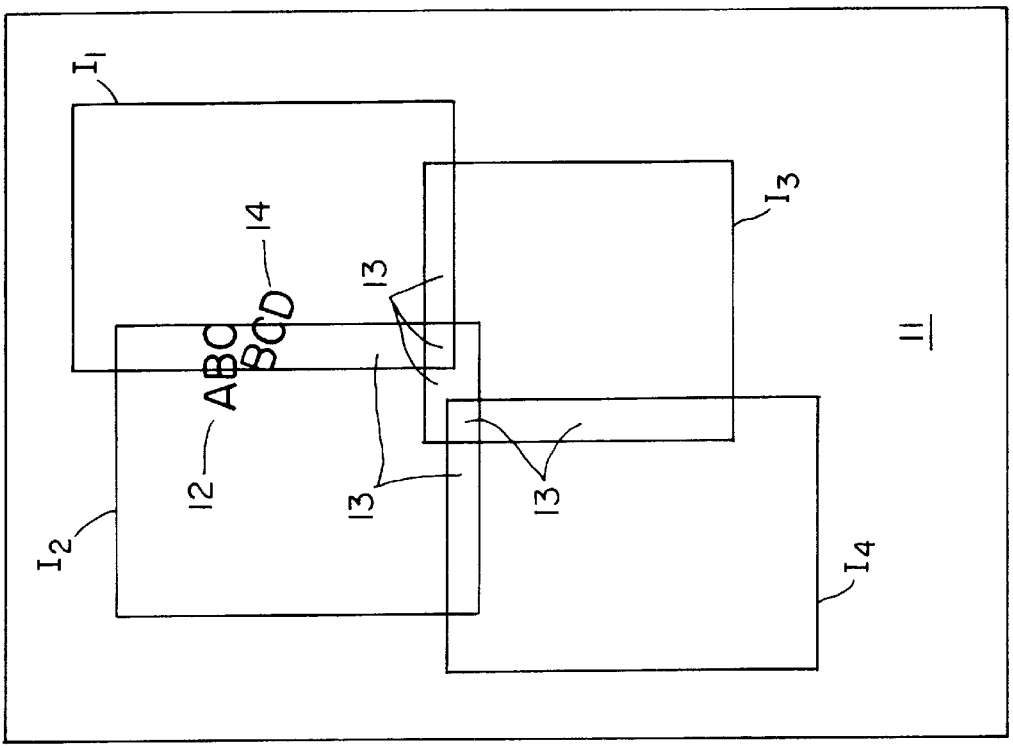
FIG. 2A is a front view of the screen of FIG. 1, without the mappings applied.

FIG. 2A is a front view of the screen 11 of FIG. 1, showing the projected images $I_1$–$I_4$ and all of the overlap regions 13. To demonstrate some of the problems, some text, "ABCD" is projected across the overlap. A first portion 12 of the text is projected in image $I_2$. A second portion 14 is projected in image $I_1$. Note that the two portions of text are not aligned. In addition, the text 14 of image $I_1$ is not oriented correctly with respect to the text of image $I_2$.

FIG. 2B is a view of the screen 11 after the methods of the present invention have been applied to the system. Images $I_1'$–$I_4'$ are the mapped images of $I_1$–$I_4$ respectively. The regions included within dashed lines $I_1$ and $I_4$ correspond to the original projection areas of FIG. 2A. They are still covered by the corresponding projectors but have been mapped out of the image. Overlap regions have been labeled $O^{xyz}$ where x, y and z refer to the images that overlap. Note that, without moving any of the projectors $P_1$–$P_4$ or the screen 11, and without making any adjustments to the projectors themselves, the text 16 is now projected seamlessly across the overlap area $O_{12}$.

The projector errors which are not easily correctable using these techniques are those which result in loss of resolution, i.e., defocusing, of the projected image. These include spherical aberration, field curvature, and longitudinal color aberration in the optical system.

To achieve smooth transitions with the coordinate mapping, the pixel location calculation is performed at a resolution significantly higher than that of the screen, camera or projector coordinates, and the resulting sub-pixel location of the written point in projector space is used as the basis for an anti-aliased write operation, updating the intensities already present in the bitmap at that location.

In regions $O_{xyz}$ where there are two or more overlapping projectors targeting the same screen coordinate, a preferred embodiment of the present invention writes the screen coordinate pixel into all of the overlapping projector bitmaps. A portion of the required intensity is allocated to each projector according to the relative distance of each written projector's pixels from that projector's boundary, resulting in a gradual transition from projector to projector as we scan across a region in the screen coordinate system.

Projectors may have different relative intensities of the color components, either globally, or in a way which depends on the projector coordinate. These defects can be repaired by normalizing the written color intensity by a local, projector dependent, color mapping function. This technique, together with the gradual transitions between projectors described above, assures good color matching between displayed tiles on the screen.

Even defects in the manufacturing of projectors may be partially compensated for. By allowing computation within the display writing loop, defective locations in a projector display can be partially or completely corrected for by adjusting the intensity of neighboring pixels. In screen regions where only a single projector is available, it may be advantageous to assign a portion of the brightness of a defective pixel to one or more adjacent pixels, to maintain the correct local average brightness.

Figure 3:
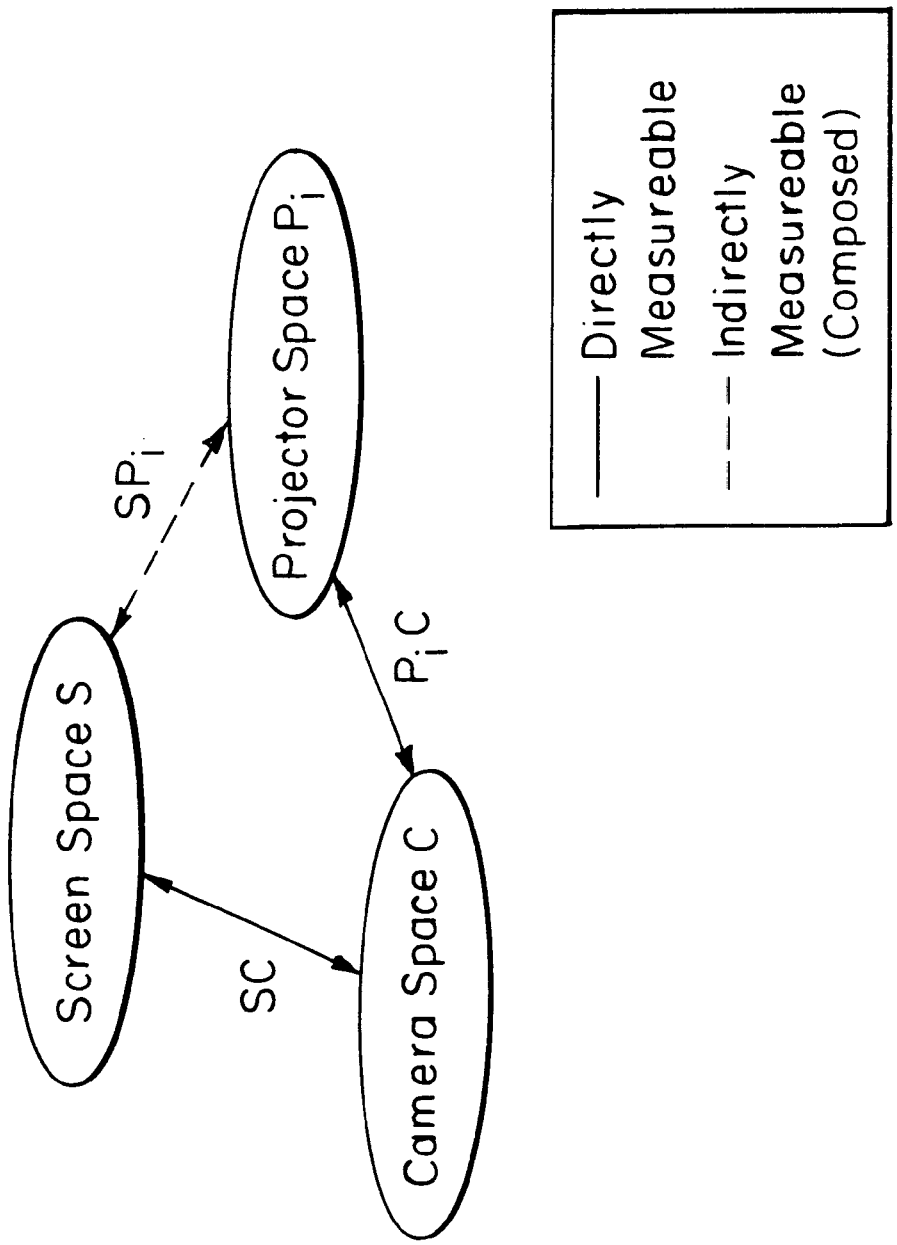
FIG. 3 is a block diagram illustrating the functional relationship between camera, projector and screen spaces, for a single projector.

As FIG. 3 shows for a single projector, formalized, the challenge is to display a bitmap image on a screen S. Each projector has its own bitmapped addressable space $P_i$, which is projected onto S. FIG. 3 shows the functional relationship between the spaces and whether they are directly or indirectly measurable.

For example, the screen space S to camera space C relationship is directly measurable by placing a test chart over the screen 11 and taking a picture with the camera 17. Similarly, the projector $P_i$ to camera space C is directly measurable by projecting individual pixels in the projector and detecting where in camera space C they appear.

The projector space $P_i$ to screen space S relationship $SP_i$, however, is not directly measurable, and is thus shown in dotted lines. It can, however, be composed from the two directly measurable relationships, or mappings.

Creating a seamless image requires mappings between $P_i$ and S. Once mappings are determined, it is possible to display a desired image anywhere on the screen 11 that a projector projects, correcting for all optical, overlap and intensity distortions using a process known as digital image warping. Approximations to these mappings are established using the camera 17, along with photogrammetry and machine-vision techniques. The camera bitmap represents a snapshot of camera space C.

First, the mapping between C and S is established by taking a picture of a number of precise reference landmarks on S. Then, a number of pictures of $P_i$ projected onto S are taken. Both sets of mappings are composed to provide the mapping between $P_i$ and S. All of the mappings are bijective, i.e., they are one-to-one mappings, so they can be inverted as well. The present invention effectively establishes and uses these mappings.

A preferred embodiment of the present invention comprises an M×N array of projectors, rear or front projecting onto a screen, as shown in FIG. 1. The projectors are connected to a computer 18 which is in turn connected to a camera for feedback. In a prototype of the system of FIG. 1, the four projectors used are Epson Power-Lite 5000 liquid crystal display (LCD) projectors. Each projector is capable of displaying 800 by 600 pixels (SVGA resolution) at 450 lumens, making the system capable of a theoretical 1600× 1200 pixel resolution. The computer is outfitted with Appian Graphic Jeronimo Video Cards and uses a Matrox Meteor Frame Grabber to digitize the NTSC input from the Pulnix TM540 CCD camera. The system of FIG. 1 is a basic building block which can be employed to build huge video walls composed of many more projectors and cameras.

Figure 4A:
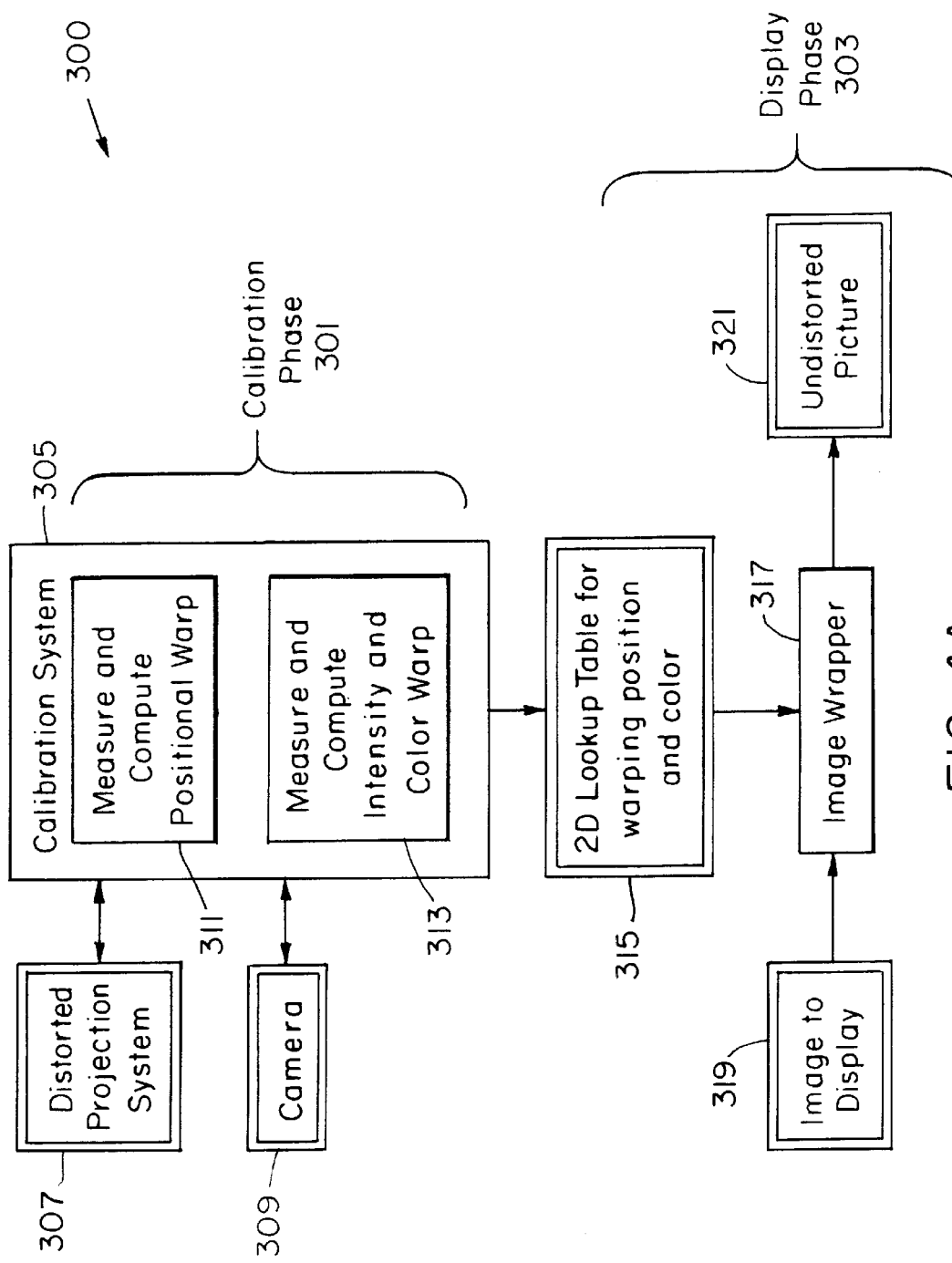
FIG. 4A is a block diagram illustrating the general scheme of a preferred embodiment of the present invention.

FIG. 4A is a block diagram illustrating the general scheme 300 of a preferred embodiment of the present invention. There are two phases: a calibration phase 301 in which the camera 309 is calibrated and mappings are determined for a particular setup; and a display phase 303 in which the desired image 319 is displayed on a screen or projection surface.

During the calibration phase 301, a calibration system 305 first calibrates the camera 309. The calibrated camera 309 and the projection system 307, with all of the distortions it introduces, are then used to measure and compute a positional correction function or warp (box 311) and an intensity and color correction function of warp (box 313). The outcome of the calibration phase 301 is a two-dimensional lookup table 315.

During the display phase 303, the lookup table 315 is used by an image warper 317 to warp an image 319 to be displayed. By applying the warping function of the lookup table 315 to the image 319, a distorted or warped image is sent to the projectors. The warping compensates very closely for the distortions of the projection system 307, so that the outcome is an undistorted picture 321 projected onto a projection surface such as a screen.

Figures 4B, 5:
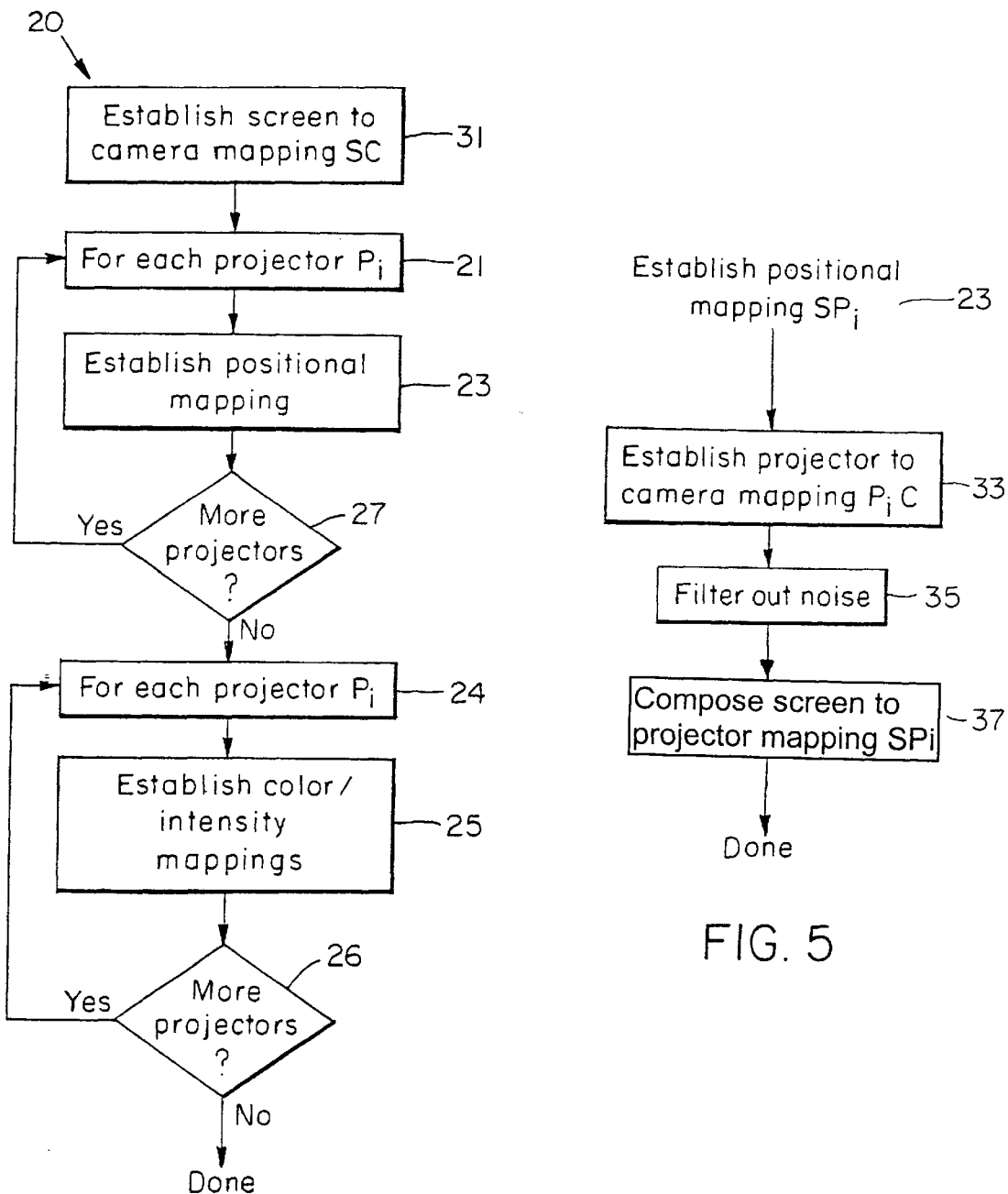
FIG. 4B is a flowchart of the present invention's method of producing mappings.
FIG. 5 is a flowchart of the steps comprising the step of establishing a positional mapping from FIG. 4.

FIG. 4B is a flowchart 20 of a preferred embodiment's method of producing mappings and corresponds to block 305 of FIG. 4A. First, in step 31, the camera is calibrated by producing a screen to camera mapping SC. Next, positional mappings $SP_i$ are established for each projector $P_i$ (steps 21, 23, 27). Finally, color/intensity mappings are established for each projector $P_i$ (steps 24, 25, 26). Finally, in step 27, except for calibrating the camera (step 31), this process is repeated for each projector.

Positional Warping

A preferred embodiment of the present invention achieves sub-pixel registration and positionally warps an image to create an imperceptibly positionally seamless image across a multiple channel projection system. A mapping between screen and projector space is established, and then is used to digitally warp the input image to account for geometrical and overlap distortions across the projection systems.

FIG. 5 is a flowchart of the process of establishing the screen space to projector space mapping $SP_i$, corresponding to step 23 of FIG. 4B. The mapping is established using photogrammetry, machine vision and functional composition, in a four-step process.

First, in step 33, a projector to camera mapping $P_iC$ is established. In step 35, noise introduced by various effects such as quantizing as well as optical effects, is filtered out of the mappings. Finally, in step 37, the $P_iC$ mappings are composed with the screen to camera mapping SC derived in step 31 (FIG. 4B), to produce a screen to projector mapping $SP_i$. Note that in establishing the positional mappings, the pictures of the test charts taken by the camera may first have the background subtracted out.

Establishing the Screen Space to Camera Space Mapping

To factor out positional distortion introduced by both the placement of the feedback sensor, i.e. the camera, and its optics, a screen space S which is separate from camera space C must be established.

One embodiment takes a picture of a few landmark points and with these measurements, estimate parameters in a camera distortion model using non-linear optimization techniques. Such a model accounts for a cameras' position and angle relative to a screen, as well as lens parameters such as radial distortion, off-center distortion etc.

Lenz and Tsai, "Techniques for Calibration of the Scale Factor and Image Center for High Accuracy 3D machine Vision Metrology", IEEE Journal of Robotics and Automation, VOL RA-3, No. 4, August 1987, give an excellent description of how to create a camera model appropriate to a particular physical setup and then to estimate its parameters. Such modeling tends to minimize the number of parameters that need to be estimated to achieve accurate results. The more accurate the model, the less robust the method is to changes in the physical setup such as changing lenses etc., which typically requires inputting a new focal length into the model. The motivation for reducing the number of measurements is obvious when one considers that camera calibration is often done manually.

On the other hand, computation is inexpensive enough that a preferred embodiment of the present invention employs a brute force method which requires little physical modeling but many measurements, yielding extremely accurate results. The approach is to take a picture of many, e.g., thousands, of evenly spaced landmarks arranged in a grid and simply sample the distortion, linearly interpolating all intermediate points. The more closely spaced the points, the more accurate the estimates are.

While this approach is brute force in nature, it is extremely simple for calculations and is very robust to changes such as lens position, attitude, and focal length. Such changes are automatically accounted for in the model because the positions of the landmarks that make up the system parameters change automatically with these physical system changes.

In addition, the brute force approach trivially accounts for local distortions that are not accounted for in the analytical models of the first approach. An additional advantage of the brute force method is that it directly produces the two-dimensional lookup table mapping between screen space and camera space. This table is an input used by the present invention, so that even if the system were modeled in the traditional way, a similar table would have to be generated using the model parameters.

Figure 6:
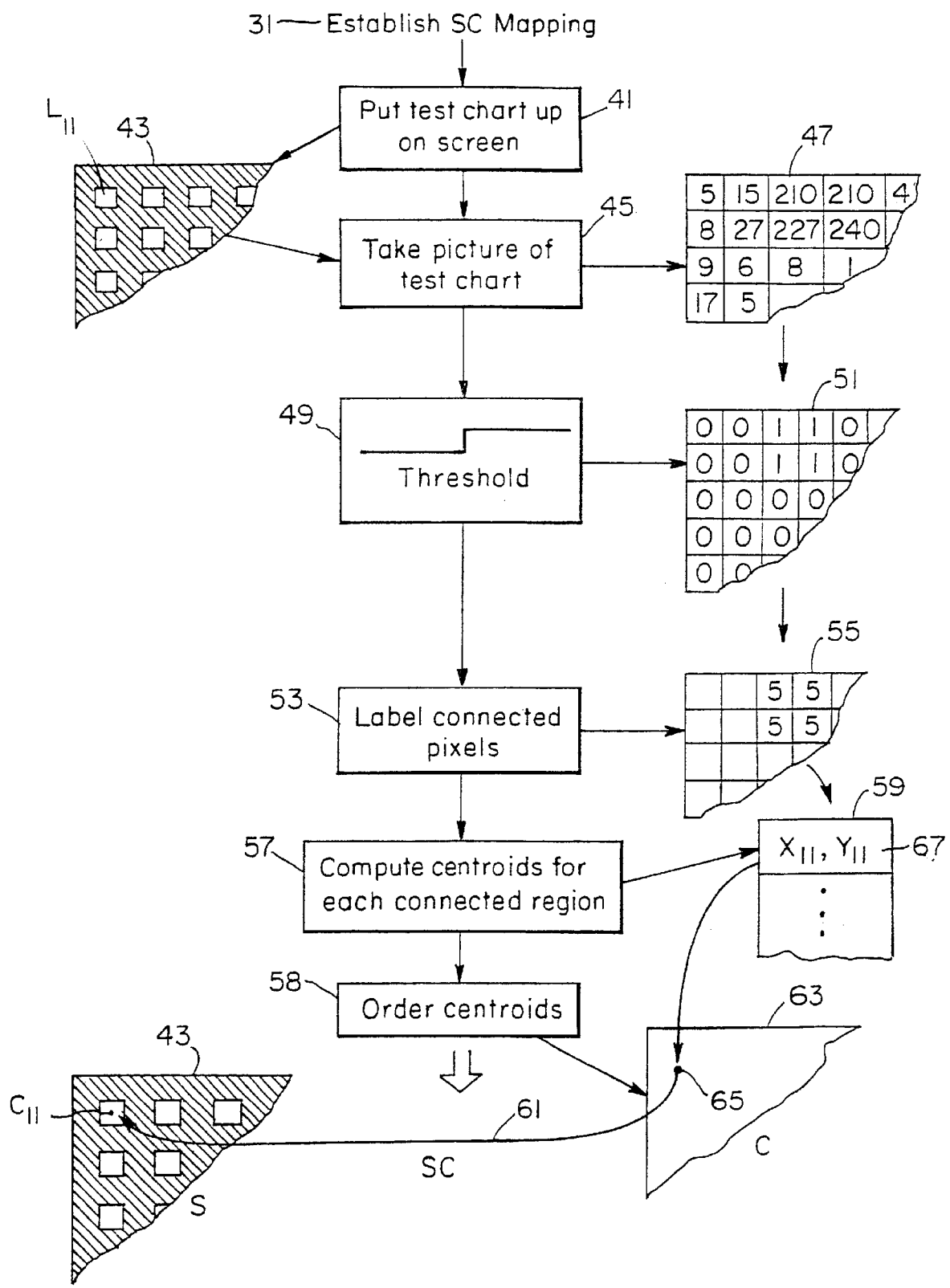
FIG. 6 is a flowchart of the steps comprising the step of establishing a screen to camera mapping from FIG. 5.

FIG. 6 is a flowchart showing details of step 31 from FIG. 4B, establishing the screen to camera mapping SC. First, in step 41, a test chart 43 is placed over the screen. Preferably, the test chart comprises a grid of equally spaced squares or landmarks. For example, a prototype chart has squares 10 mm wide, with 10 mm space between the squares.

Next, in step 45, a picture of the test chart 43 is taken by the camera 17 (FIG. 1), providing a projection of an optically correct two-dimensional screen space onto camera space, represented by the two dimensional picture bitmap 47. Each entry in the picture bitmap 47 represents an intensity value for the corresponding camera pixel.

After the picture is taken, a machine vision algorithm is employed. In step 49, the picture 47 is thresholded. The process of thresholding creates a two dimensional array 51 with the same dimensions as the picture bitmap 47, in which each entry is a one if the corresponding pixel value in the bitmap 47 is greater than or equal to a threshold value, or a zero if the corresponding pixel value in the bitmap 47 is less than the threshold value.

The threshold array 51 is then used to create a connected region array 55. A connected region array 55 is the same size as the threshold array 51 and is filled, in step 53, with labels corresponding to the connected pixels in the array 51. Pixels are connected if they neighbor each other on one of four sides, i.e., above, below, left, or right, and have a one in the corresponding threshold array 51 pixel. Each connected region is given a unique label which is placed into the corresponding element of each connected pixel. Here, four pixels make up one region and each has been assigned the label "5".

Next, in step 57, the bitmap 47 and connected region array 55 are used to create a list 59 of centroids. A centroid comprising an x-coordinate and a y-coordinate is computed for each connected region. The x-coordinate of centroid for a particular connected region is computed by averaging, for each pixel in a connected region, the contribution of each pixel value multiplied by its x-coordinate. For example, if two pixels having contributions of $M_1$ and $M_2$, and x-coordinates $X_1$ and $X_2$ respectively, form a connected region, then the x-coordinate of their centroid is $$X_{centroid} = (M_1 * X_1 + M_2 * X_2)/(M_1 + M_2)$$

The y-coordinate is computed similarly.

While the pixel position coordinates $X_1$ and $X_2$ are integers, the centroid coordinate need not be. Thus, the camera has a resolution much finer than its pixel size. Because pixel values can range between 0 and 255 for high frequency objects such as squares, the dynamic range of the camera is extended well beyond the integer resolution of the camera.

The result of applying this process to the picture of the test chart 43 comprising many squares, is a list 59 of coordinate pairs which denote the positions in the picture of the centers of the squares, i.e,. centroids. For example, the first entry in the list 59 is a coordinate pair 67 represented as $(x_{11}, y_{11})$. This pair maps the center of square $L_{11}$ on the test chart 43 to location $x_{11}, y_{11}$ in camera space 63, as indicated by arrow 61. Thus this list 59 provides the screen to camera mapping SC.

In step 58, a simple heurisitic orders the centroids from the list 59 and places them into a two dimensional data structure 63. Thus, the coordinate pair 67 from the list 59 is placed at location 65 in camera space. The resulting mapping 61 thus maps point 65 to the center $C_{11}$ of a test chart landmark. Those centroids not contained within the boundary of the largest rectangle within the projected area are eliminated.

Establishing the Projector to Camera Space Mapping

Figure 7:
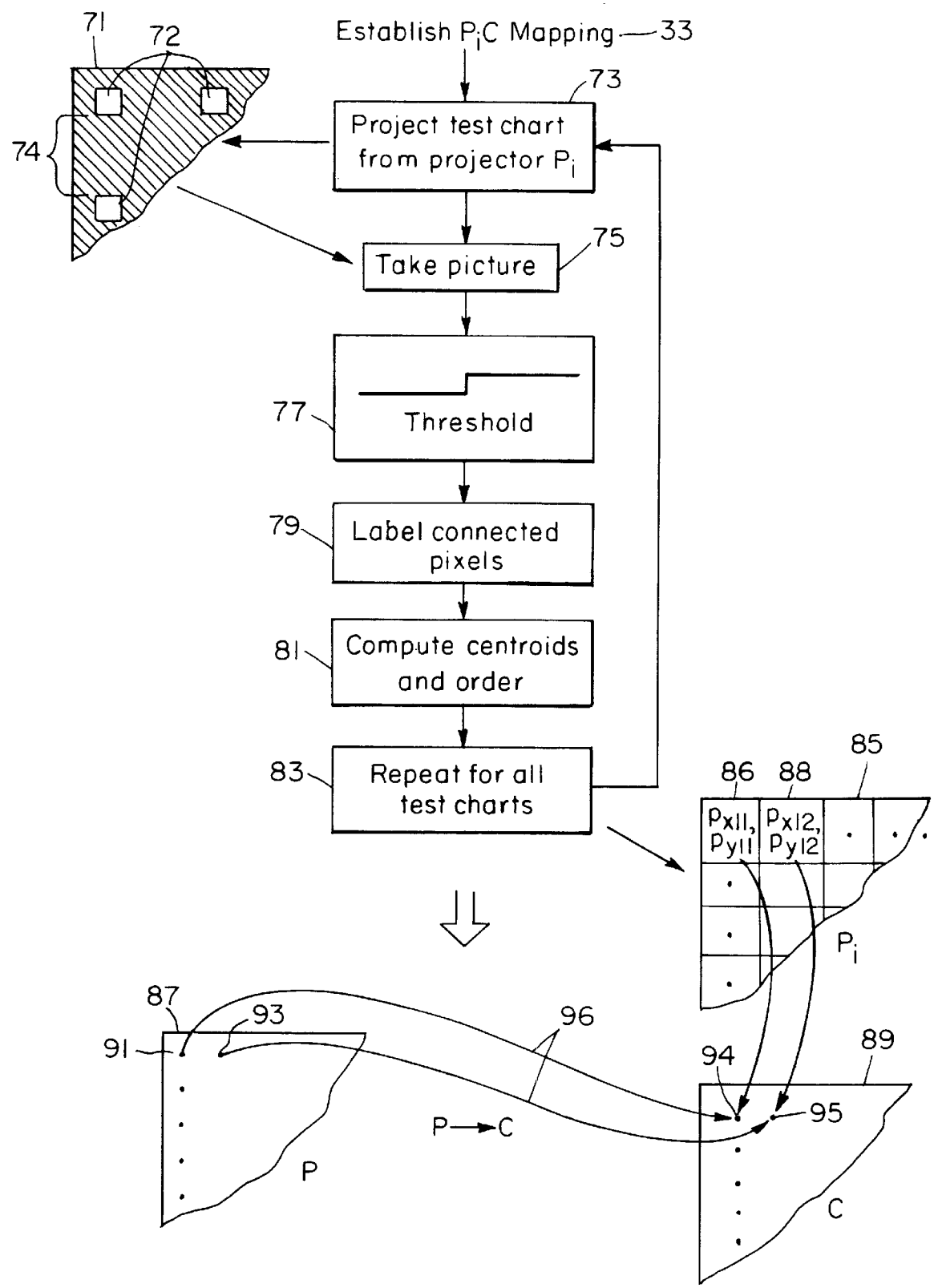
FIG. 7 is a flowchart of the steps comprising the step of establishing a projector to camera mapping from FIG. 5.

FIG. 7, corresponding to step 33 of FIG. 5, shows a similar procedure for establishing the projector space to camera space $P_iC$ mapping. Again, in a preferred embodiment, a brute force approach is chosen over a more traditional parameter limiting approach. Here, a test chart 71 is projected by the projectors. The landmarks 72 are preferably large enough to be visible to the camera 17 and to yield super resolution measurements, i.e., each landmark 72 must take up more than one camera pixel width, yet the landmarks 72 are also small enough so that as many landmarks can be displayed per picture as possible. In experiments, a 10×10 pixel block was chosen, resulting in approximately seven camera pixels being affected in each direction.

Note that the landmarks need not be projected in visible light. The landmarks may also be projected using non-visible light such as infrared or ultraviolet light. Of course, this requires an optical sensor which can sense non-visible light.

The space 74 between landmarks presents an additional concern. A large space between landmarks tends to reduce the effect light from adjacent landmarks has on a particular landmarks' measurement. On the other hand, a small space between landmarks tends to reduce the number of required test chart pictures by having as many landmarks as possible on one screen. In experiments, the landmarks are separated by 30 pixels, eliminating the measurable effect from adjacent landmarks, yet limiting the total number of required test screen pictures to sixteen per projector.

The flowchart of FIG. 7 shows the process 33 for a particular projector $P_i$. First, in step 73, the first of sixteen projector test charts 71 is projected onto the screen from the selected projector $P_i$. In step 75, a picture of the test chart 71 is taken by the camera 17. The picture is thresholded in step 77, preferably using the same threshold as in step 49 (FIG. 6). Connected pixels are commonly labeled in step 79, and connected region centroids are calculated and ordered (step 81), resulting in a new two dimensional data structure 85 which represents the projector space to camera space mapping $P_iC$. As step 83 indicates, steps 73–81 are repeated for each of the sixteen projector test charts to produce a complete projector space to camera space mapping $P_iC$.

The result is an ordered list 85 of coordinate pairs corresponding to the positions of the centers of the landmark squares of the various test charts 71. For example, the first entry in the list 85 is a coordinate pair 86 represented as $(p_{x11}, p_{y11})$. This pair maps the center of square 91, generated by the first projected test chart 71, from screen space 87 to location $P_{x11}, P_{y11}$ in camera space 89, as indicated by arrow 96. Similarly, the center of square 93, which was generated by the second projected test chart, is mapped to camera space location $P_{x12}, P_{y12}$, corresponding to entry 88 in the list 85. Thus list 85 provides the projector to camera mapping $P_iC$.

This entire process 33 is repeated for each of the projectors.

Filtering Out Noise

While distortions in the system are visibly continuous, the discrete measured data actually generated suggests some non-continuity in the distortions. One gets a visual sense of the problem in the wiggling edges of "corrected" images locally inconsistent but globally consistent with what is necessary to correct the geometrical distortion. Such measurements contain noise, most likely from thresholding, which needs to be smoothed. At the expense of losing some local distortion correction advantages which the brute force approach of massively oversampling provides, each sampled point may be smoothed and resampled using a least squares, third-order polynomial fit along each line and column of data.

Composing the Mappings

The next step is to compose both mappings and thereby achieve a mapping between projector and screen space. The screen space to camera space mapping SC and the projector space to camera space mapping $P_iC$ are both one-to-one mappings. As long as the screen space S projected into camera space C covers all the projector space $P_i$, a mapping can be derived from the two-dimensional tables. A functional inversion may be approximated by using a bilinear approximation for points lying between known data points.

Camera space C serves as an intermediary space and is composed out. The result is a screen space to projector space mapping $SP_i$ represented as a two-dimensional lookup table. The mapping can be inverted to a projector to screen mapping $P_iS$ by using a simple bilinear approximation with the inversion of neighboring points.

This process is repeated for each projector in the system. While pictures from each projector must be taken, the screen to camera space mapping SC can be reused as long as the relative orientations of the camera and screen do not change. If a projector is moved, its projector space to camera space mapping $P_iC$ must be remeasured. The $SP_i$ mappings are stored as two-dimensional lookup tables. The spaces that they map from and to depend on the type of digital image warping performed. Since the function is invertible, it is trivial to invert the mapping to reverse the spaces being mapped from or to.

Warping the Image to be Positionally Seamless

Figure 8:
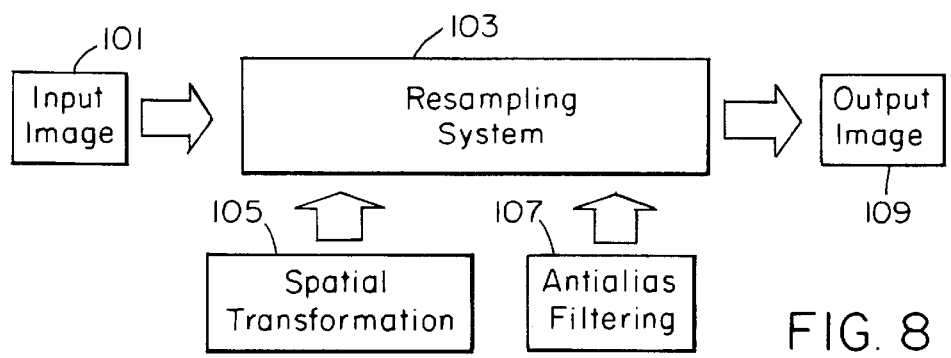
FIG. 8 is a block diagram illustrating a resampling system.

FIG. 8 illustrates the process of warping used to display an input image 101 once the mappings have been established. Digital image warping is essentially an operation that redefines the spatial relationship between points in an image. There are three aspects to digital image warping: the spatial transformation, the resampling method, and anti-aliasing methods. The input image 101 to be displayed is a bitmap which is input to the resampling system 103. The spatial transformation 105 and antialiasing filter 107 are essentially plug-ins, that is, various spatial transformations may be plugged into block 105, and various filtering algorithms may be plugged into block 107. The output 109 of the resampling system 103 is the pixel information which is sent to each projector.

The mapping function may be represented by relating screen coordinates to projector coordinates $$[x,y]=SP_i=[X(u,v),Y(u,v)], \quad (1)$$

where [x,y] are the output image coordinates of pixels in a projector's space $P_i$ and [u,v] are the input image coordinates of a pixel in image, or screen, space S. Alternatively, the mapping function can be represented by relating projector coordinates to screen coordinates:

$$[u,v]=P_iS=SP_i^{-1}=[U(x,y),V(x,y)]. \quad (2)$$

Given a spatial transformation, a discrete input image and a discrete means of output, the issue of resampling arises. Two types of resampling that can be used are forward mapping and inverse mapping. The difference stems from the different representation of the mapping functions that each uses. Both methods and their implementations are discussed below. Resampling must be performed because the input represents discrete samples of a continuous input image and the output represents discrete input that is made into a continuous signal by the projection system. The continuous input image is not available. Resampling is a means of interpolating the continuous input image from that discretized input image and then sampling at points in the input image space related to the output projector space by the spatial transformation.

Forward Mapping

Figure 9:
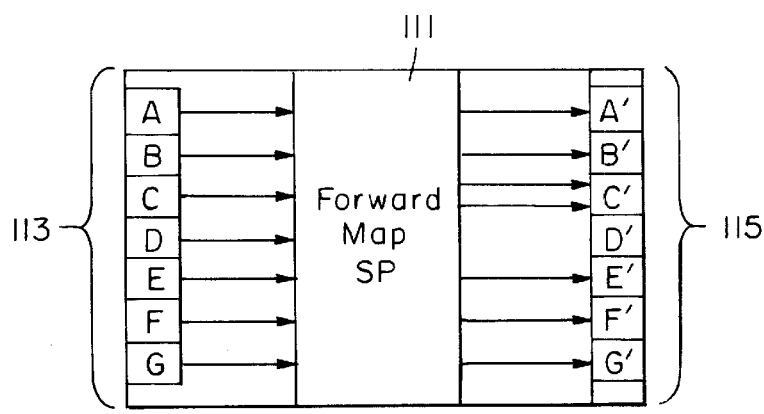
FIG. 9 is a block diagram illustrating one-dimensional forward mapping.

FIG. 9 illustrates one-dimensional forward mapping. A forward map 111 uses the transformation representation of Eq. (1) to map pixel coordinates 113 from the input image to output, or projector, coordinates 115. Each input pixel A–G is mapped from integer coordinates to real number coordinates. This is illustrated in FIG. 9 by regularly spaced input and irregularly spaced output. The real-valued output presents complications such as leaving holes where discrete output values are unmapped. For example, no input pixel is mapped to output pixel D'.

Figure 10:
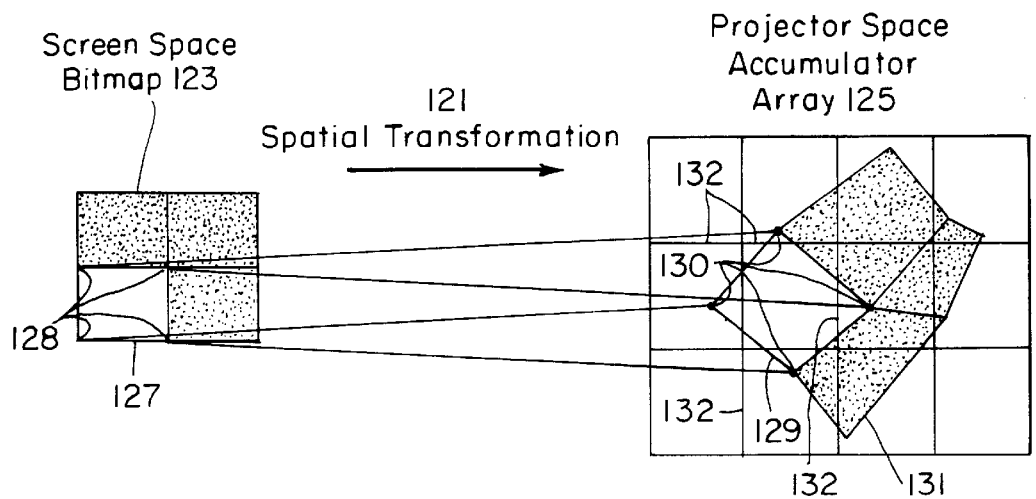
FIG. 10 is a diagram illustrating forward mapping using a four-corner mapping paradigm.

FIG. 10 shows that these complications may be avoided by using a four-corner mapping paradigm which maps square patches to output quadrilaterals in the projector space. Here, the four corners 128 of a pixel 127 from a bit map 123 in image space are mapped to four points 130 in map projector space 125 which form the corresponding square 129. With the four-corner mapping, an additional concern is that a set of four corners might map either to a single output pixel, or, as shown in FIG. 10, across several output pixels.

An embodiment of the present invention deals with the latter case by using an accumulator array at each output pixel and integrating the individual contributions to an output pixel based on the percentage of the output pixel covered by the output quadrilateral. For example, the mapped square 129 contributes to each of the output pixels labeled 132. Determining the percentage of the output pixel covered by an output quadrilateral requires clipping the output quadrilateral with the output pixel. Clipping requires intersection tests and thus, unfortunately, is very expensive.

Traditionally, this problem has been dealt with by adaptively sampling the input such that the projected area size approaches a reasonable limit size of one pixel. The contributions from each input pixel and numbers of input pixels contributing to an output pixel converge to single values, and expensive intersection tests are not necessary. Increasing the sampling rate to such a level translates into selecting an appropriate size for a virtual pixel on the screen from which to map from screen to projector coordinate with approximately one pixel size distortion.

Inverse Mapping

FIG. 11A illustrates one-dimensional inverse mapping. An inverse map 141 uses the mapping function of Eq. (2) to map projector coordinates 145 in projector space to input coordinates 143. In essence, each projector pixel A'–G', represented as an integer, is projected back into the image, as a real number in image coordinate space. The value of the projector pixel is determined by input pixels near the mapped input point. No accumulator array is required and all output pixels are colored. However, there is no guarantee that all input pixels are used, as indicated in FIG. 11A where input pixel D is unused. Thus, additional filtering must be applied to mitigate the introduction of unnecessary artifacts in the output.

Anti-aliasing

FIG. 11B illustrates use of the nearest neighbor approach in forward mapping. A pixel 205 from the input image 201 is mapped to real-number coordinates corresponding to some point 209 in projector space 203. The mapping is represented by line 207. The nearest integer pixel 211 to the point 209 is determined and the value of the input pixel 205 is written to the output pixel 211.

FIG. 11C illustrates use of the nearest neighbor approach with inverse mapping. A pixel 213 from projector space 203 is inverse mapped to real-number coordinates corresponding to some point 217 in image space 201. The inverse mapping is represented by line 215. The nearest input image integer pixel 219 to the point 217 is determined and the value of that input pixel 219 is written to the projector pixel 213.

If a nearest neighbor approach is used with either forward mapping (FIG. 11B) or inverse mapping (FIG. 11C), then where there is little change of scale there can be a fair amount of visual artifacts due to aliasing in the output. Sampling at the nearest available point can have visually displeasing consequences such as jagged lines. Antialiasing filters may be applied in both the forward mapping and inverse mapping processes to reduce and eliminate these visual artifacts.

In the case of forward mapping, one approach that is easily implemented is bilinear interpolation. A bilinear filter is implicit in the four-corner mapping with the accumulator discussed above with reference to forward mapping. Here, the input image is mapped from screen space S to projector space $P_i$ and reconstructed using linear interpolation. The resulting continuous image is then integrated within each pixel boundary and the result placed into the corresponding pixel in the resulting bitmap. This is a very costly operation. Other reconstructions and subsequent integration are possible, however they are even more costly computationally and thus are rarely performed.

The opportunities for antialiasing for inverse mapping are more numerous as most implementations are computationally comparable. Filtering can be employed in the resampling stage once it is determined where in the input to sample from. Because a determined point may not have integer coordinates, it is better to resample the image by first reconstructing a continuous representation around that point based on available samples, and resampling that representation at the desired point.

Fortunately, there are different interpolation kernels, for example, Windowed Sinc Lanczos windows, Hamming Window, cubic spline, cubic convolution, and exponential and linear interpolation. Wolberg, "Digital Image Warping", IEEE Computer Society Press, Los Alamitos, Calif., 1990, provides an excellent description of each of these methods. The difference between the nearest neighbor and linear approaches is extreme and visually worth correcting, however the benefit-to-effort ratio can be minuscule. Of course, this also depends on the image being resampled.

System Resolution

Ascribing a resolution to the system is not straightforward. A first order measure which serves as an upper bound for an M×N array of projectors, each with a resolution of Q×R pixels, is $M*N*Q*R$. However, due to overlap and geometric distortion, the vertical and horizontal resolutions of the largest rectangle which can be inscribed within the bounds of the projected area, i.e., the number of pixels which can be counted by tracing a line from left to right or top to bottom can vary quite extensively. For example, in a prototype 2×2 projector array where each projector has a resolution of 800×600 pixels, lines drawn from top to bottom vary from 1230 pixels to 1300 pixels, and from left to right from 900 pixels to 1000 pixels. By no means does this represent a regular grid of pixels.

What resolution frame buffer can this irregular grid of pixels do a good job of reproducing? One good answer is the average of the number of pixels counted by simply tracing some straight lines using the mappings. The goal is to limit the amount of magnification and minification by limiting scaling of the input bitmap. In any case, this number can be fed back and used to determine the size of an appropriate frame buffer to make a seamless display.

Eliminating Seams with Color and Intensity Warping

To color projector pixels so that there are no perceivable seams, color and intensity mappings are created for each output pixel that take into account the intensity and overlap distortions between and among the projectors. These mappings warp or pre-distort input images appropriately. The mapping are created by measuring distortions, using the positional relationships already established, along with the projectors and the calibration camera.

Several issues arise in calibrating a good quality edge-blended projection array that uses a CCD camera for feedback.

Where the screen gain is not unity, "hot spots", or localized bright spots, can appear, for example on an extremely reflective (high-gain) surface. It is difficult, if not impossible, to create a feedback system with such a screen using a single camera, because the hot spots may form blind spots for the feedback system. Thus, the single camera feedback embodiment of the present invention uses a near-unity gain screen because the diffusive screen eliminates the hot spot problem.

Human perception, aided by two eyes rather than one eye viewing the screen, is able to vastly reduce the blind spots in perceived vision of the screen. Similarly, multiple cameras may be used to make a system that would not have blind spots in the aggregated image used for feedback. Since the multiple camera approach more accurately models human perception, the unity gain requirement from the use of single camera is lessened.

The relationship between real world measurements and the camera output must be understood in order to reproduce images in their true fidelity by using a CCD camera in the feedback system to create the color and intensity mappings. The physical phenomenon of rising charge in response to impinging photons, is fundamentally linear. Thus, CCDs are linear-intensity measurement devices.

In the consumer industry, however, output devices are typically cathode ray tubes (CRTs). Thus, consumer grade CCD cameras typically output a gamma corrected signal to compensate for the non-linearity in the relationship between voltage input and intensity output of CRTs. Gamma correction corrects for a functional relationship between the actual output intensity and the input which is approximately the ratio of the input and the maximum input taken to the gamma power. A gamma of one denotes a completely linear relationship. Note that the gamma of the camera determines the fidelity with which the camera can distinguish output intensities, yielding higher fidelity for values of gamma near one. The camera's gamma, if known apriori or measured, can have its effects compensated for in the camera output thus resulting in feedback input that is consistent with the real world.

The exact relationship between input and output can be determined by simply measuring the relationship using the overlap region, and some cleverly selected test patterns on each projector whose measured intensities in the overlap regions are the same independently. When both are projected, the intensity in the overlap region is twice as large, but the measured value depends on the desired relationship. By scanning through intensities and noting the measured value in the overlap region one can derive the desired relationship.

One of the main points of using a camera is to have feedback that lets one measure the brightness distortions across the output. Lenses typically have intensity distortion generally comprising vignetting, a high rolling off in sensitivity at the edges of a lens. One way to calibrate this effect out of the measured data sets would be to take a picture of a uniformly bright test screen and use that to determine the effect of the vignetting. This is a practice known as flat-fielding.

An alternative is to physically model the distortions and estimate parameters in the model by measuring physically realizable test scenes. In a first approximation, the area of the input picture used for feedback is limited to the portion corresponding to the inner part of the lens which tends to be much less distorted than the outer part. With this approach, intensity distortion can be ignored to some extent.

Another source of intensity distortion is the distance from the screen. However, a lambertian screen by definition factors out most of this problem and thus this issue is not particularly relevant. It is important to note that the human eye can tolerate a fair amount of distortion in brightness uniformity as long as the distortion varies smoothly. Since the camera actually is more sensitive, creating a smoothly intensity-varying scene for the camera should suffice for creating a uniformly bright perceived scene for the eye. Finally, an additional consideration in any mapping is that turning on a pixel illuminates the area around it, a phenomenon known as screen flare. This effect cannot be ignored when trying to calibrate a system to display a uniform color across a system of edge-blended projector arrays, and is probably the most difficult effect to calibrate out of the system.

When using a camera/projector-based feedback system to accomplish color matching, the difference between perceived color and spectral color must be considered. The task of matching spectral color is impossible in a system that uses additive red, green and blue for reproduction since only three of the frequencies are represented. While the eye does not separate out red, green, and blue, the same logic that makes it possible to separate these colors out for color reproduction in a projector system applies to separating them out for the purpose of color matching. Thus, in a preferred embodiment, color matching is performed either by using color filters with a monochromatic camera, or by using a color camera. The problem of creating a uniformly perceived red, green or blue screen is then accomplished by using feedback.

The issue of color mixing to achieve uniformly mixed colors may be further resolved by assuming that the measured projected values among the projected colors do not have significant positional intensity distortion. Simply put, relative values of each independent pair of red, green and blue effectively determine the perceived color at a point. If there is substantial positional intensity distortion of the color, their relative values will differ at different locations and thus the color should differ as well. Fortunately even if there is substantial aggregate positional intensity distortion, as long as the relative values of red, green and blue are maintained, this effect is also mitigated for color mixing.

Finally, note that color constancy is also determined by adjacent colors. Thus, if the positional color ratio distortion transition is smooth, the perceived change may be minimized and perceived color constancy maintained.

Because the choices of relative color values, contrast ratio and white and black levels in the manually calibrated systems are limited by the physical capabilities of the projection system, rather than by the limits of manual calibration, it is not surprising that the choices in the automatically calibrated systems are best limited in the same manner. The difference is that in the automatic calibration case the dynamic range of the camera plays a role in determining the white and black levels. Therefore, the camera's range must be set wide enough to cover the dynamic range of the projectors, or some dynamic range in output will be lost.

A preferred embodiment of the present invention follows a strategy similar to that described previously for establishing a positional mapping, for creating a lookup table for each projector pixel that can be used to warp its intensity so that a uniformly bright intensity is displayed across the system. That is, taking one set of measurements and computing the desired mapping, taking into account all issues previously mentioned. This approach is complicated by the amount of modeling that must be done.

In an alternative, preferred embodiment, rather than iterating several equations which model a system, the system itself is iterated starting with an initial guess. The result is compared against a desired value ref, an error computed and a new guess is based on the error. A simple feedback system 167 is used to iterate the system:

$$v_j(t+1)=v_j(t)-\omega \times (q_j(t)-\text{ref})$$

where $\omega$ is some weight given to a projector's contribution to a pixel.

Figure 12C:
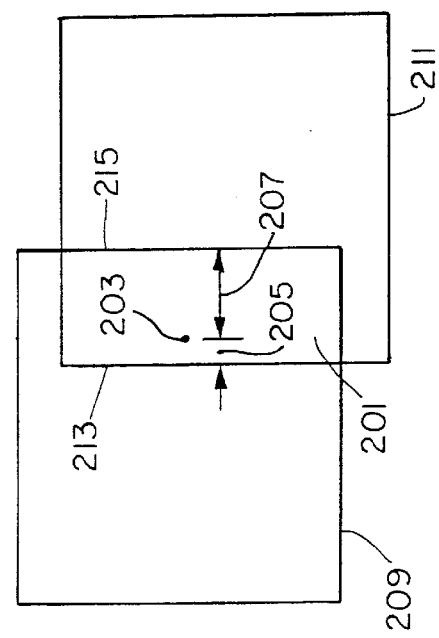
FIG. 12C is a diagram showing how different projectors contribute to a pixel in an overlapping region.
Figure 12D:
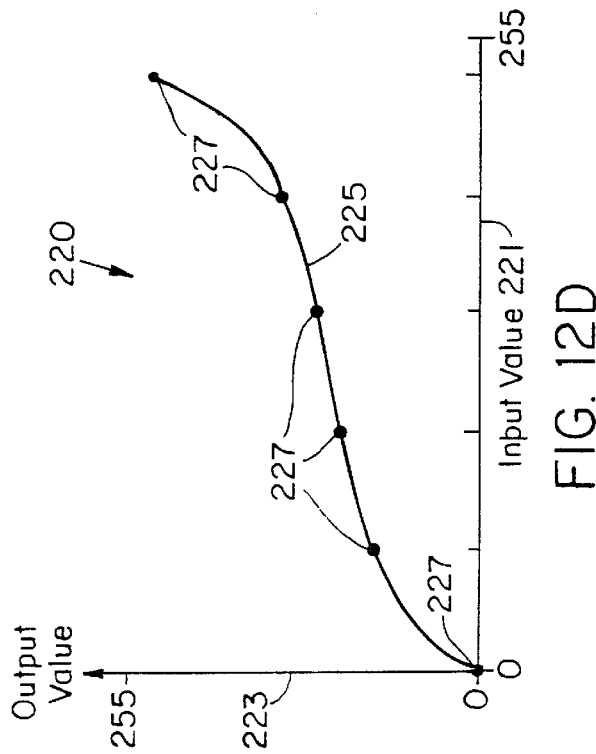
FIG. 12D is a graph showing output (sensed) intensity versus input value.
Figure 12A:
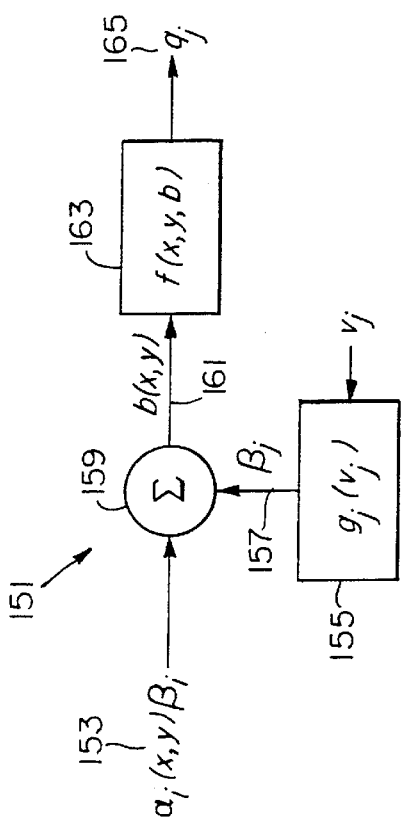
FIG. 12A is a block diagram illustrating a model of the effects of illumination.
Figure 12B:
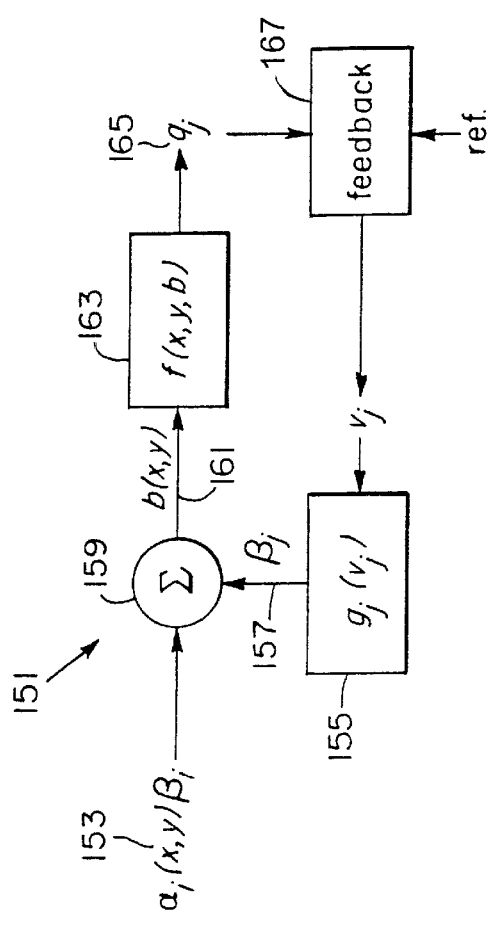
FIG. 12B is a block diagram of the model of FIG. 12A with a feedback mechanism.

FIG. 12A illustrates a model 151 of the measured output $q_i$ from the camera for each projector pixel i. The measured value $q_i$ is a function of the camera's position and orientation, the particular pixel's input value $v_i$, and the values of the surrounding pixels. Specifically, for each pixel j there is a transfer function $g_j$, that maps input values to output intensity contributions $\beta_j$. In addition, there is a camera transfer function f for each screen position which maps brightness b(x,y) to camera measurement $q_j$. The summing of light is accounted for by the adder 159 which adds up illumination contributions 153 from other pixels. For example, the contribution 153 from pixel i is a product of a scalar $\alpha_i(x,y)$, which represents geometric effects on the illuminations from pixel i, times the output intensity contribution $\beta_i$ of that pixel.

These functional relationships show the nature of the coupling between input intensities and output intensities—how a change in a pixel's color has an effect across the system. While this inter-pixel coupling is not extreme, it is empirically measurable. The function g and the output intensities $\beta_i$ must be known to construct a solution to display a single intensity across the system, so a methodology to compute and measure them must be constructed.

This model 151 enables the computation of intensity measured at any one point, based on all input pixel values for all of the projectors. To display a uniform color across the system, the equations derived from the model must be solved, adding the constraints of the overlapping regions, etc. This requires that thousands of coupled equations be solved. Even in the linear case, iteration may be used to solve the problem.

In an alternative, preferred embodiment, rather than iterating several equations which model a system, the system itself is iterated starting with an initial guess. The result is compared against a desired value ref. an error computed and a new guess is based on the error. A simple feedback system is used to iterate the system:

$$v_j(t+1)=v_j(t)-\omega \times (q_j(t)-\text{ref})$$

where $\omega$ is some weight given to a projector's contribution to a pixel.

As FIG. 12C shows, the actual implementation is complicated by the fact that in an overlap region 201 of two projections 209, 211, the contribution of each projector must be smoothly rolled off toward the projector's projection edge. A preferred embodiment accounts for this in the feedback loop with the reference. That is, the contributions to a point 203 within an overlap region 201 are determined by weighting the reference value based on the point's Manhattan pixel distance 205 from the closest edge 213 over the sum of all such distances 205, 207 from each projection's edge 213, 215 respectively. Manhattan distance is the smallest number of pixels encountered between a starting pixel to an ending pixel, where travel is only permitted in horizontal and vertical, i.e., not diagonal directions.

With a solution for creating a uniformly bright intensity, a lookup table is preferably associated with each sample point in the map. The desired table for a particular color, i.e., red, green or blue, and position is created by varying the intensities of the landmarks of the projected test chart.

FIG. 12D illustrates a sample input/output relationship 220. The horizontal axis 221 represents input value, i.e., the value fed to a projector. The vertical axis represents output value, i.e., the intensity value registered by the camera. The relationship is defined by curve 225. In a preferred embodiment, six sample points 227 are uniformly spaced across the full intensity range. Output values corresponding to input values between sampled points are linearly interpolated from the map 220. Thus six intensity mappings are stored in a table associated with each sample point. Note that because intensities are derived for a set of pixels, the map for a particular pixel must be bilinearly interpolated from the four regions surrounding that pixel or the output will not be smooth.

Depending on the projection system, this process can be repeated for each color. For example, in a system where a color wheel is employed one need only calibrate one color. In a system where three imaging units are used, sampling all three might be necessary.

Frame Buffer Configurations

FIGS. 13A–13E illustrate several preferred configurations of the present invention with regard to the frame buffers, although the present invention is not limited to only these configurations.

Figure 13A:
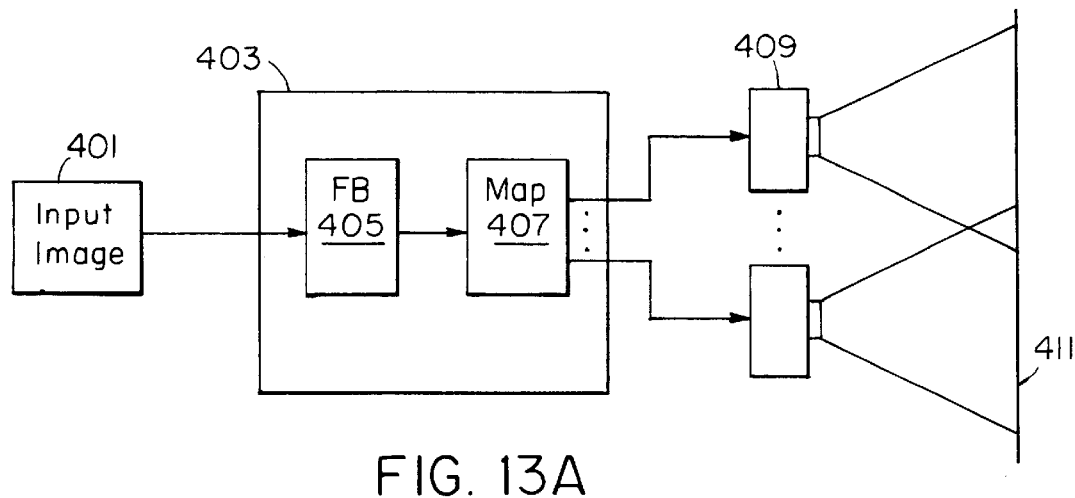
FIGS. 13A and 13B are schematic diagrams illustrating embodiments of the present invention in which the correction mapping occurs is applied to pixel data taken from the frame buffer.

FIG. 13A illustrates a system in which pixel data from the input image 401, which may be generated, for example, by a VCR, a laser disc player, a computer, or some other source, is stored in a frame buffer 405 which is typically within a computer 403. The pixel correction function, or mapping 407, is applied to the pixel data between the frame buffer 405 and the display hardware 409, which projects the corrected image onto a screen 411. The pixel correction function 407 may comprise additional memory for storing corrected image pixel data.

Figure 13B:
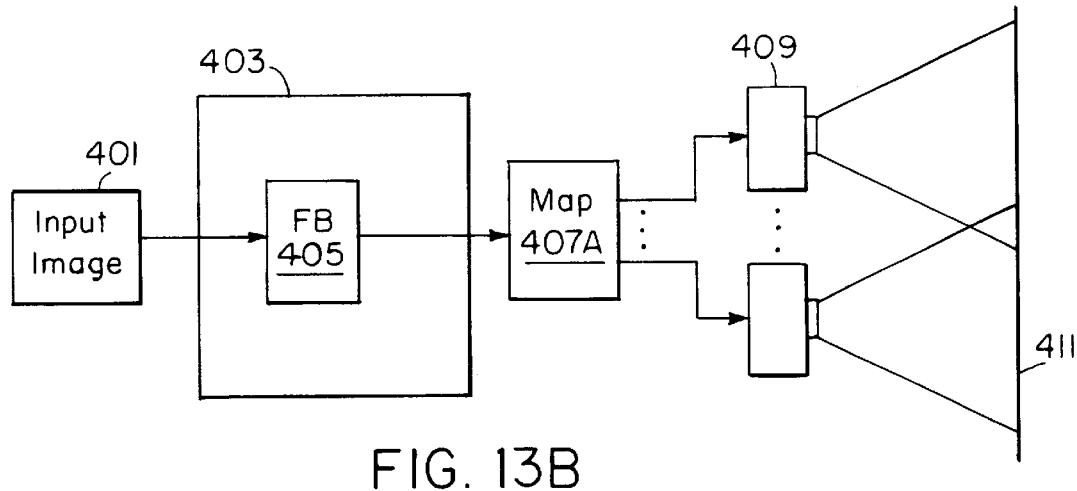

FIG. 13B illustrates a similar configuration in which the pixel correction function 407A comprises a separate piece of hardware external to the computer 403.

Figure 13C:
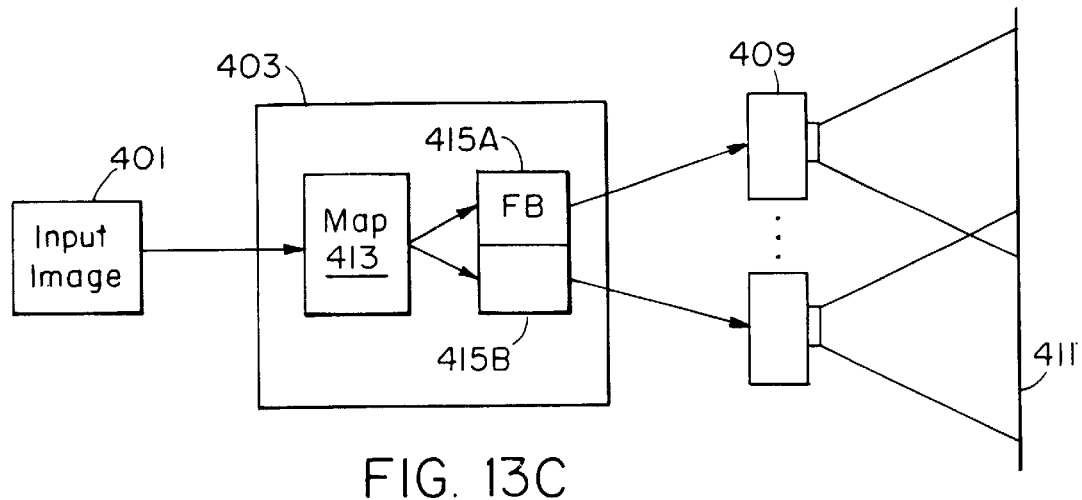
FIG. 13C is a schematic diagram illustrating an embodiment of the present invention in which the correction mapping is applied to pixel data before the pixel data is stored in the frame buffer.

FIG. 13C illustrates a system in which the correction function 413 is applied to the pixel data before being stored in the frame buffer 415, so that the corrected pixel data is stored in the frame buffer, and the display hardware 409 is driven directly from the corrected pixel data. Different portions 415A, 415B of the frame buffer 415 are allocated to different projectors 409. Because the projections from the various display hardware 409, i.e., the projectors, overlap, the mapping function 413 may store pixel information associated with the overlap region redundantly in each frame buffer portion.

Figure 13D:
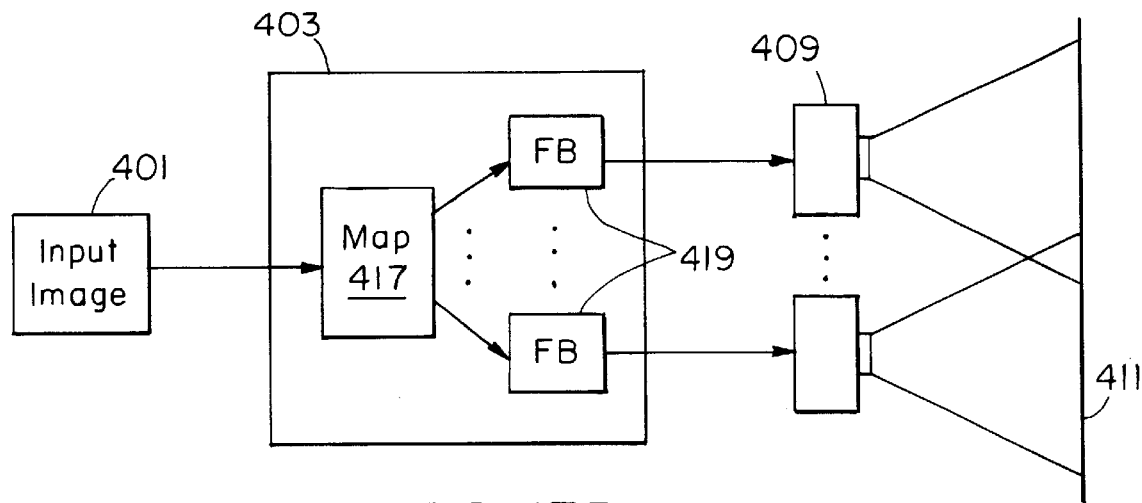
FIG. 13D is a schematic diagram illustrating an embodiment of the present invention having one frame buffer per projector.

FIG. 13D illustrates another system in which there is a separate frame buffer 419 for each projector 419. The frame buffers may be fed from a common correction function 417. Of course, in a system in which the correction function is applied after the frame buffers, a separate correction function would have to be applied to each frame buffer (not shown).

Figure 13E:
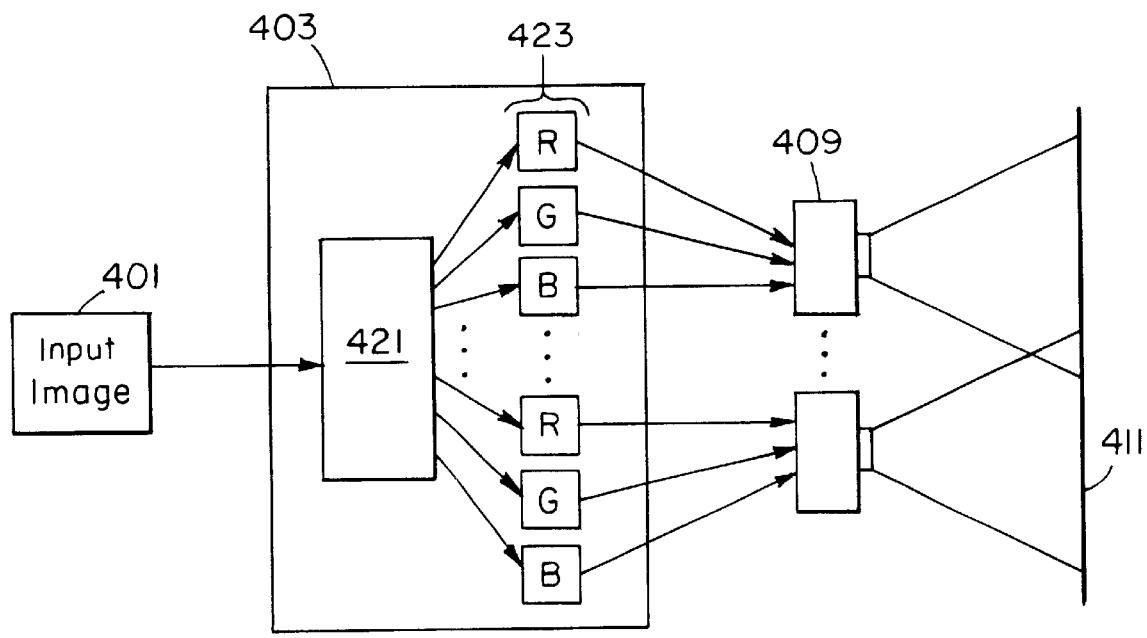
FIG. 13E is a schematic diagram illustrating an embodiment of the present invention having one frame buffer per color per projector.

Finally, FIG. 13E illustrates yet another system in which there is a separate frame buffer 423 for each of the colors, i.e., red (R), green (G) and blue (B) for each projector. The mapping 421 is virtually the same as the mapping 417 of FIG. 13D except for the multiple outputs per projector. Again, alternatively, the mappings may be applied after the frame buffers rather than before (not shown).

Other Embodiments

In an alternative embodiment, during calibration, one pixel at a time is illuminated. Because it is the only illuminated pixel, its position can be uniquely identified on a linear sensor. With a pair of such, preferably orthogonal, sensors, the screen coordinates of a projected single pixel can be uniquely determined. Such sensors are commercially available with resolutions up to 10,000 pixels for use in flat bed scanners.

Moreover, such sensors need not sense color. We have control over the color of the projected pixel—and we can project each color independently, just as we project each pixel location independently. Thus, we can derive three independent mappings, one for each projected color, for each of the projection displays.

Alternatively, more sophisticated techniques allow the projection and sensing of multiple pixels simultaneously, particularly after coarse alignment is complete. Sensing small displacements as corrections is done with many pixels simultaneously.

Figure 14:
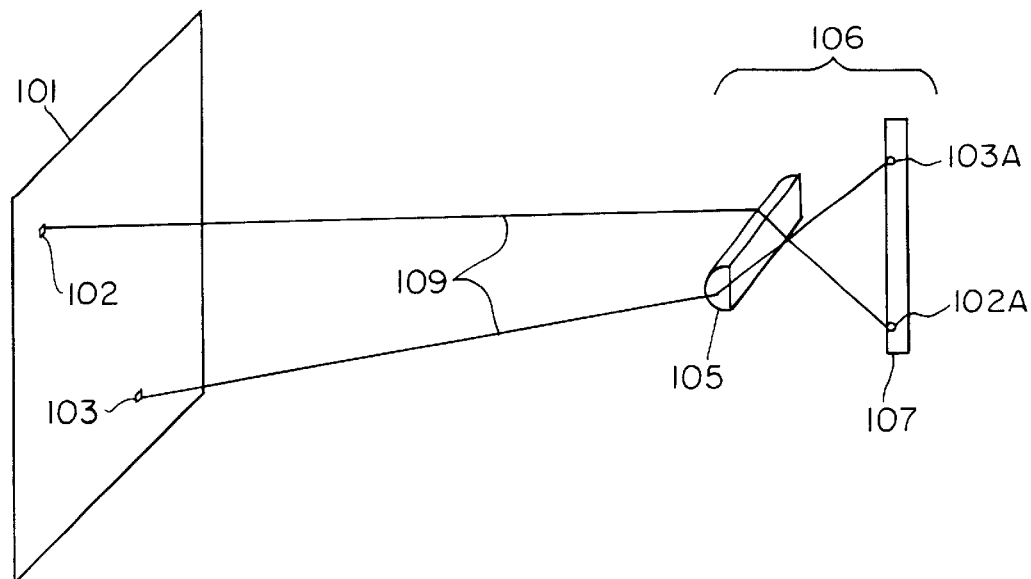
FIG. 14 is a schematic diagram illustrating an alternative embodiment of the present invention using a linear sensor.

The alignment sensing mechanism could thus consist of a pair of line sensors. FIG. 14 illustrates one line sensor 106. Each line sensor comprises a cylindrical lens 105 which focuses the light from a pixel 102 in one axis onto the linear sensor array 107 at a point 102A. Light in the other axis falls on the sensor unfocused, from all directions.

Again, we can use the fact that we have control over the displayed image to sense the difference between the linear array sensor output with the display pixel illuminated and with it absent. Such differential sensing allows much higher sensitivity and the rejection of background light. By examining the output of pairs of sensors, we can splice together an array of sensors in much the same way that we have spliced together an array of projectors.

In yet another embodiment, due to mechanical, optical or cost reasons, sensors cover only the overlap region between two or a small number of projectors. It should be possible to construct smooth high resolution atlases only from such local information. Such sensor splicing techniques may be used to fabricate very high resolution cameras, as well.

Both rear and front projection techniques can be used, and the sensor can be located either on the same side of the screen as the projector, or on the opposite side. Rear projection and rear sensing, if space is available, is perhaps superior, given the lack of interference from users blocking the light and sensing path. Optionally, a spherical, hemispherical, or cylindrical screen may be employed, with users either inside or outside the screen, and with projection and sensing done from the opposite side of the screen.

Fully Overlapped Small-fill-factor Displays and Imagers

Figure 15:
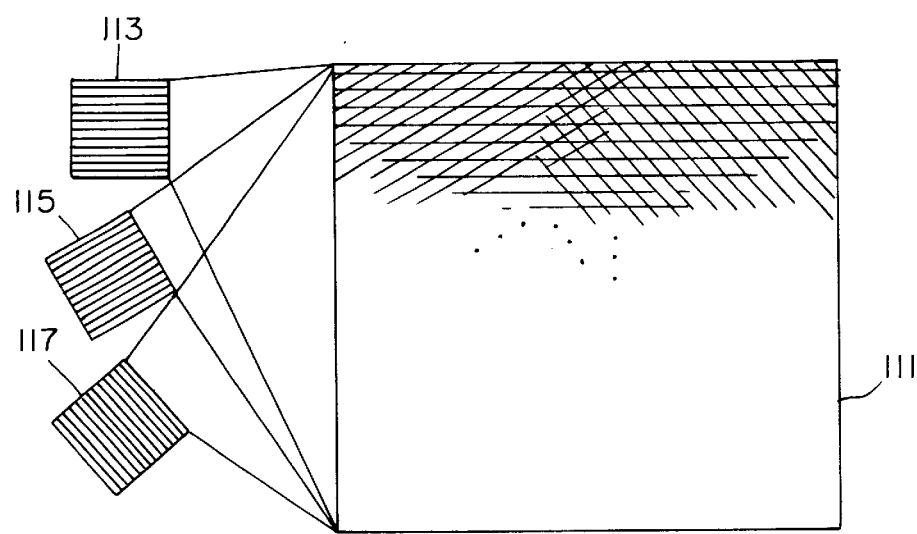
FIG. 15 is a diagram of a screen displayed from a fully overlapped small-fill-factor embodiment of the present invention.

FIG. 15 illustrates a preferred embodiment for displaying high resolution screens with relatively low-resolution projectors uses small-fill factor projectors. Fill-factor is the portion of the pixel spacing which is illuminated. In a small-fill-factor projector, the magnified image appears as a set of small dots separated by black regions, where the dot spacing corresponds to the pixel spacing, while the size of the dots is substantially smaller.

Imagine that many such displays, such as 113, 115 and 117 completely overlap, one on top of the other. The rasters of these screens are not aligned and may not be exactly parallel, although the degree to which this is true has been magnified for illustration purposes. Each display has a random angle, displacement, and scale relative to the others. In such a way, we can practically guarantee that any portion of the screen is covered by many pixels, from many different projectors. Again, by measuring accurately the position of the pixels corresponding to each projector, we can calculate which pixels to illuminate to display a particular color and intensity value at a particular screen coordinate. In general, multiple pixels may be illuminated. Each color may be treated separately to eliminate lateral chromatic aberration.

With such a technique, the expected usable pixel density rises as the square root of the number of projected images, due to statistical spread in the placement of the pixels. Thus, while this embodiment is useful for perhaps doubling or tripling the effective linear pixel density, it may not be a cost effective technique to increase the density ten times, since this would require 100 low resolution projectors.

A potential difficulty is the presence of moire patterns (aliasing) in the pixel pattern. This can be eliminated by predictable but random jitter introduced in the pixel placement.

Point of View Manipulation

The display of static two dimensional images can be improved by the techniques described above, but we can apply these same techniques to the display of real time three dimensional images, as well. One approach is to measure the position of the viewer, and perform real time parallax correction on the displayed image. This technique could be used, for example, as a way of making a wall display appear as a window into an adjacent room or portion of a room. A full wall display could give the illusion of being part of a single, contiguous, larger space. A outside viewed hemispherical display could appear to be three dimensional physical object, viewable from any angle.

Binocular cues could be provided by supplying each eye with a different image. Standard approaches to this problem include frame triggered shutters for each eye, projected polarization control, red/blue colored glasses. Another approach may be to project six colors, using distinct narrow band color filters for each eye.

Auxiliary Technologies

There are a variety of auxiliary ideas which complement the high resolution displays described here. Some examples include the incorporation of pen or finger locating techniques along with the display as a way of providing user input to a computer system using such displays.

For example, finger position may be sensed by using the change in the reflective characteristics of ground glass when a finger is placed over a portion of the glass. The presence of the finger dramatically changes the amount of light reflected from the surface of the glass, potentially allowing a sensor to detect the light change from the rear reflected image.

Along with the finger location sensor is the use of a fiducial marker displayed offset from the finger (perhaps a centimeter above the finger) as a way of providing high accuracy pointing, while avoiding covering the display with the finger being used to point. Such an "offset pointing" technology may be useful in more conventional application areas.

In a further embodiment, calibration may be performed dynamically by stealing frames, i.e., taking an occasional frame or portion thereof and rather than displaying the usual picture, displaying a calibration pattern.

In yet another embodiment, a display output may be modified to account for some obstruction, possibly a moving obstruction, for a given viewpoint.

Another embodiment employs the aforementioned techniques to correct for various types of distortion.

Finally, the present invention may be used where the projected image changes from frame to frame, as, for example, in a movie or an animation.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of displaying images comprising:
   selectively projecting pixels from a projector onto a projection surface;
   sensing the pixels as projected across the projection surface;
   deriving a projector/screen mapping based on the selected pixels and the sensed pixels;
   deriving a pixel correction function based on the projector/screen mapping;
   storing the pixel correction function as a lookup table;
   applying the pixel correction function to input image pixel data to produce corrected pixel data which corrects at least for misalignment; and
   driving the projector with the corrected pixel data.

2. A method as claimed in claim 1 wherein the pixel correction function corrects for misalignment of plural projections in a common region.

3. A method as claimed in claim 1 wherein the pixel correction function corrects for intensity variations across a projected image.

4. The method of claim 1 wherein the pixel correction function corrects for imperfections across a projected image.

5. The method of claim 1 wherein the pixel correction function corrects for chromatic aberration.

6. The method of claim 1 wherein the pixel correction function corrects for rotational distortion.

7. The method of claim 1 wherein the pixel correction function performs smooth warping of the input image.

8. The method of claim 1 wherein a portion of the input image is generated by at least one of a VCR, laser disc and a computer.

9. The method of claim 1 further comprising, between the steps of storing a pixel correction function and applying the pixel correction function, the step of storing pixel data in a frame buffer, such that the pixel correction function is applied to the pixel data between the frame buffer and the projector.

10. The method of claim 1 further comprising, between the steps of applying the pixel correction function and driving the projector, the step of storing the corrected pixel data in a frame buffer, such that the projector is driven from the corrected pixel data in the frame buffer.

11. The method of claim 1 wherein the plural projectors are provided, each with a respective frame buffer.

12. The method of claim 11 wherein the pixel correction function corrects for misalignment of overlapping pixel arrays.

13. The method of claim 11 wherein the pixel correction function blends overlapping projection regions.

14. The method of claim 11 wherein a separate frame buffer is provided for each of plural colors in each of plural adjacent projection regions.

15. The method of claim 11 wherein the plural projectors have a small fill factor and the projected images fully overlap.

16. The method of claim 11 wherein the pixel correction function corrects for color mismatch across a projected image.

17. The method of claim 1 wherein a separate frame buffer is provided for each of plural colors.

18. The method of claim 1 wherein the projector output is sensed by an optical sensor that is displaced from the projection surface.

19. The method of claim 18 wherein the optical sensor comprises a pair of orthogonal linear sensor arrays.

20. The method of claim 18 wherein the optical sensor comprises at least one camera.

21. The method of claim 18, wherein deriving the projector/screen mapping comprises:
   deriving a sensor/screen mapping;
   deriving a projector/sensor mapping; and
   deriving the projector/screen mapping by composing the sensor/screen mapping with the projector/sensor mapping.

22. The method of claim 21, wherein deriving the sensor/screen mapping comprises:
   positioning a calibration test chart at the projection surface, and
   creating a mapping between pixels in sensor space and projection surface positions by viewing the test chart with the optical sensor.

23. The method of claim 22 wherein positioning is done by placing the test chart at the projection surface.

24. The method of claim 22 wherein positioning is done by projecting the test chart onto the projection surface.

25. The method of claim 21, wherein deriving the projector/sensor mapping comprises said selectively driving projector pixels while sensing the projector output.

26. The method of claim 21, wherein selectively driving projector pixels comprises illuminating one pixel at a time.

27. The method of claim 21, wherein selectively driving projector pixels comprises sequentially projecting one of plural test screens.

28. The method of claim 21, in wherein deriving the sensor/screen mapping comprises:
positioning a calibration test chart at the projection surface, and
creating a mapping between pixels in sensor space and projection surface positions by viewing the test chart with the optical sensor.

29. The method of claim 23, wherein at least a portion of a frame is occasionally used to display a calibration pattern.

30. The method of claim 1, wherein a projected image changes from frame to frame.

31. The method of claim 1 wherein applying the pixel correction function further comprises applying an antialiasing filter.

32. The method of claim 1 wherein the projector output is projected onto a curved surface.

33. The method of claim 1 wherein the projector output is projected onto an irregular surface.

34. The method of claim 1, further comprising:
measuring a position of a viewer; and
performing real-time parallax correction to image pixel data responsive to the viewer's position.

35. The method of claim 34, further comprising:
providing each of the viewer's eyes with a different image.

36. The method of claim 35, further comprising:
providing frame triggered shutters for each eye.

37. The method of claim 35, further comprising:
providing projected polarization control.

38. The method of claim 35, further comprising:
providing red/blue colored glasses.

39. The method of claim 35, further comprising:
projecting plural colors; and
using distinct narrow band color filters for each eye.

40. A method of displaying an image comprising:
providing plural projectors which project overlapping pixel arrays onto a projection surface;
storing a pixel correction function, the pixel correction function comprising a lookup table which maps pixels between projector coordinate spaces and projection surface coordinate space based on projector/screen mappings for each projector; and
generating, from an input image and the stored pixel correction function, modified pixel data which, when driving the plural projectors, corrects for misalignment of overlapping pixel arrays.

41. The method of claim 40, further comprising:
providing at least one frame buffer for storing a desired screen display; and
applying the stored pixel correction function to a frame buffer output to drive the plural projectors.

42. The method of claim 41 further comprising associating at least one frame buffer with each projector.

43. The method of claim 42 further comprising providing a separate frame buffer for each of plural colors in each of plural adjacent projection regions.

44. The method of claim 40 wherein the plural projectors have a small fill factor and projected images fully overlap.

45. The method of claim 40 wherein the pixel correction function is based on mappings of frame buffer pixels to screen pixels.

46. The method of claim 45 further comprising generating the projector/screen mappings with a sensor that is displaced from the projection surface.

47. The method of claim 46 wherein the sensor comprises two orthogonal linear sensor arrays.

48. The method of claim 46 wherein the sensor comprises at least one camera.

49. The method of claim 46 further comprising calibrating the sensor by positioning a calibration test chart over the projection surface, and viewing the test chart with the sensor to create a mapping between projection surface positions and pixels in sensor space.

50. The method of claim 40 wherein the pixel correction function corrects for lateral and rotational displacement of adjacent projected pixel arrays.

51. The method of claim 40 wherein the pixel correction function corrects for nonuniform intensity across a projected image.

52. The method of claim 40 wherein the pixel correction function corrects for color mismatch across a projected image.

53. A method of displaying images comprising:
providing a frame buffer for driving projector pixels for projection onto a projection surface;
providing a stored pixel correction function, the pixel correction function comprising a lookup table which maps between projector coordinate space and projection surface coordinate space based on a projector/screen mapping;
generating, from an input image and the stored pixel correction function, modified pixel data which, when applied to the frame buffer to drive the projector, corrects at least for misalignment caused by imperfections across a projected image.

54. The method of claim 53 wherein the pixel correction function corrects for misalignment of color images in a common region.

55. The method of claim 53 wherein the pixel correction function corrects for intensity variations across the projected image.

56. The method of claim 53 further comprising providing plural projectors and a frame buffer associated with each projector.

57. The method of claim 56 wherein the modified pixel data corrects for misalignment of pixel arrays from the plural projectors.

58. The method of claim 56 wherein the modified pixel data blends pixel arrays in overlapping regions.

59. The method of claim 56 wherein the pixel correction function is based on mappings of frame buffer pixels to screen pixels.

60. The method of claim 53 further comprising generating the mapping with a sensor that is displaced from the projection surface.

61. The method of claim 60 wherein the sensor comprises two orthogonal linear sensor arrays.

62. The method of claim 60 wherein the sensor comprises at least one camera.

63. The method of claim 60 further comprising calibrating the sensor by positioning a calibration test chart over the projection surface, and viewing the test chart with the sensor to create a mapping between projection surface positions and pixels in sensor space.

64. A system for displaying images comprising:

a projector;

a projection surface onto which output from the projector is projected;

a sensor for sensing the projector output as projected across the projection surface the sensor being displaced from the projection surface;

at least one processor for determining a projector/screen mapping by selectively driving projector pixels and reading the sensed projector output from the sensor; and at least one processor for applying a pixel correction function to input image pixel data to correct at least for misalignment, said at least one processor driving the projector with the corrected pixel data, the pixel correction function comprising a lookup table which maps between projector coordinate space and screen coordinate space based on the projector/screen mapping.

65. The system of claim 64 further comprising:

a frame buffer for storing pixel data, such that the pixel correction function is applied to the pixel data between the frame buffer and the projector.

66. The system of claim 64 further comprising:

a frame buffer for storing the corrected pixel data, such that the projector is driven from the corrected pixel data in the frame buffer.

67. The system of claim 64 further comprising plural projectors, each projector being associated with a frame buffer.

68. The system of claim 67 wherein the pixel correction function corrects for misalignment of overlapping pixel arrays.

69. The system of claim 67 wherein the pixel correction function blends overlapping projection regions.

70. The system of claim 67 wherein a separate frame buffer is provided for each of plural colors in each of plural adjacent projection regions.

71. The system of claim 67 wherein the plural projectors have a small fill factor and the projected images fully overlap.

72. The system of claim 64 wherein the pixel correction function corrects for lateral and rotational displacement.

73. The system of claim 64 wherein a separate frame buffer is provided for each of plural colors.

74. A multiple projector display system comprising:

plural projectors which project overlapping pixel arrays onto a projection surface;

a stored pixel correction function comprising a lookup table which maps between projector coordinate space and projection surface coordinate space based on a projector/screen mapping; and at least one processor which generates, from an input image and the stored pixel correction function, modified pixel data which, when driving the plural projectors, corrects for misalignment of overlapping pixel arrays.

75. The system of claim 74 further comprising:

at least one frame buffer, wherein the stored pixel correction function is applied to a frame buffer output to drive the plural projectors.

76. The system of claim 74 further comprising:

at least one frame buffer associated with each projector, such that the modified pixel data is applied to the frame buffers to drive the plural projectors.

77. The system of claim 74 wherein a separate frame buffer is provided for each of plural colors in each of plural adjacent projection regions.

78. The system of claim 74 wherein the plural projectors have a small fill factor and the projected images fully overlap.

79. The system of claim 74 wherein the pixel correction function is based on mappings of frame buffer pixels to screen pixels.

80. The system of claim 74 further comprising a sensor for deriving the projector/screen mappings wherein the sensor is displaced from the screen.

81. The system of claim 80 wherein the sensor comprises two orthogonal linear sensor arrays.

82. The system of claim 80 wherein the sensor comprises at least one camera.

83. The system of claim 80 wherein the sensor is calibrated by positioning a calibration test chart over the projection surface, and viewing the test chart with the sensor to create a mapping between projection surface positions and pixels in sensor space.

84. The system of claim 74 wherein the pixel correction function corrects for lateral and rotational displacement of adjacent projected pixel arrays.

85. The system of claim 74 wherein the pixel correction function corrects for nonuniform intensity across a projected image.

86. A projection system comprising:

a frame buffer for driving a projector;

a stored pixel correction function, the pixel correction function comprising a lookup table which maps between projector coordinate space and projection surface coordinate space based on a display/screen mapping;

at least one processor which generates, from an input image and the pixel correction function, modified pixel data which, when applied to the frame buffer to drive the projector, corrects for imperfections across a projected image.

87. The system of claim 86 wherein the pixel correction function corrects for misalignment of color images in a common region.

88. The system of claim 86 wherein the pixel correction function corrects for intensity variations across the projected image.

89. The system of claim 86 comprising plural projectors and a frame buffer associated with each projector.

90. The system of claim 86 wherein the modified pixel data corrects for misalignment of pixel arrays from the plural projectors.

91. The system of claim 86 wherein the modified pixel data blends pixel arrays in overlapping regions.

* * * * *

UNITED STATES PATENT AND TRADEMARK OFFICE
CERTIFICATE OF CORRECTION

PATENT NO. : 6,456,339 B1
DATED : September 24, 2002
INVENTOR(S) : Rajeev J. Surati and Thomas F. Knight, Jr.

It is certified that error appears in the above-identified patent and that said Letters Patent is hereby corrected as shown below:

Column 25,
Line 13, delete "claim 21" and insert -- claim 25 --;
Line 20, delete "claim 23" and insert -- claim 27 --;

Column 27,
Line 11, insert -- , -- after "surface".

Signed and Sealed this

Fifth Day of October, 2004

JON W. DUDAS
*Director of the United States Patent and Trademark Office*